United States Patent
Akita et al.

(10) Patent No.: US 9,749,947 B2
(45) Date of Patent: Aug. 29, 2017

(54) WIRELESS COMMUNICATION APPARATUS AND WIRELESS COMMUNICATION CONTROL METHOD THAT PERFORMS COMMUNICATION USING A FREQUENCY DIVISION MULTIPLEXING METHOD

(71) Applicant: Mitsubishi Electric Corporation, Chiyoda-ku (JP)

(72) Inventors: Minoru Akita, Tokyo (JP); Akinori Fujimura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 15 days.

(21) Appl. No.: 14/783,317

(22) PCT Filed: Apr. 19, 2013

(86) PCT No.: PCT/JP2013/061572
§ 371 (c)(1),
(2) Date: Oct. 8, 2015

(87) PCT Pub. No.: WO2014/171003
PCT Pub. Date: Oct. 23, 2014

(65) Prior Publication Data
US 2016/0057698 A1    Feb. 25, 2016

(51) Int. Cl.
G08C 17/00 (2006.01)
H04W 52/02 (2009.01)
(Continued)

(52) U.S. Cl.
CPC ...... *H04W 52/0203* (2013.01); *H04B 7/1851* (2013.01); *H04B 7/208* (2013.01); *H04W 72/10* (2013.01); *Y02B 60/50* (2013.01)

(58) Field of Classification Search
CPC H04W 52/0203; H04W 72/10; H04B 7/1851; H04B 7/208
See application file for complete search history.

(56) References Cited

U.S. PATENT DOCUMENTS

| 4,931,802 A | 6/1990 | Assal et al. |
| 6,014,366 A | 1/2000 | Ichiyoshi |

(Continued)

FOREIGN PATENT DOCUMENTS

| CA | 2 298 862 A1 | 8/2000 |
| EP | 0 472 018 A2 | 2/1992 |

(Continued)

OTHER PUBLICATIONS

International Search Report issued Jun. 4, 2013, in PCT/JP2013/061572 filed Apr. 19, 2013.

*Primary Examiner* — Abdelnabi O Musa
(74) *Attorney, Agent, or Firm* — Oblon, McClelland, Maier & Neustadt, L.L.P.

(57) ABSTRACT

A wireless communication apparatus reducing power consumption of a large circuit size switch unit, includes a demultiplexing unit that separates an input multiplexed signal into plural signals for each input port, a prestage rearrangement unit that rearranges the plural signals input from the demultiplexing unit and outputs plural prestage rearranged signals for each input port, a switch unit that inputs the plural prestage rearranged signals output from the prestage rearrangement unit provided for each input port as plural signals before switching and applies switching processes to the plural signals before the switching to be output as plural switched signals for each output port, a poststage rearrangement unit that inputs and rearranges the plural switched signals output from the switch unit for each output port and outputs plural poststage rearranged signals for each output port, and a multiplexing unit that multiplexes the plural poststage rearranged signals for each output port.

13 Claims, 19 Drawing Sheets

(51) Int. Cl.
*H04B 7/185* (2006.01)
*H04B 7/208* (2006.01)
*H04W 72/10* (2009.01)

(56) References Cited

U.S. PATENT DOCUMENTS

| | | |
|---|---|---|
| 6,327,603 B1 | 12/2001 | Niu et al. |
| 6,330,287 B1 | 12/2001 | Caso et al. |
| 6,349,118 B1 | 2/2002 | Caso et al. |
| 6,393,066 B1 | 5/2002 | Moretti et al. |
| 6,798,848 B1 | 9/2004 | Claxton et al. |
| 2004/0120276 A1 | 6/2004 | Golla et al. |
| 2004/0185775 A1 | 9/2004 | Bell et al. |
| 2004/0246994 A1 | 12/2004 | Munoz et al. |
| 2010/0150013 A1* | 6/2010 | Hara ............ H04L 25/0224 370/252 |
| 2010/0151800 A1* | 6/2010 | Akita ............ H04W 52/0238 455/75 |
| 2011/0019783 A1* | 1/2011 | Nakano ............ H03H 11/126 375/344 |
| 2011/0305178 A1* | 12/2011 | Zheng ............ H04B 7/0671 370/311 |
| 2012/0269238 A1 | 10/2012 | Fujimura |
| 2013/0242857 A1 | 9/2013 | Tani |
| 2014/0036765 A1 | 2/2014 | Fujimura et al. |
| 2015/0249462 A1* | 9/2015 | Chang ............ H03M 1/122 398/43 |

FOREIGN PATENT DOCUMENTS

| | | |
|---|---|---|
| EP | 1 445 897 A2 | 8/2004 |
| JP | 5-304494 A | 11/1993 |
| JP | 2738385 B2 | 4/1998 |
| JP | 2977562 B2 | 11/1999 |
| JP | 2000-252933 A | 9/2000 |
| JP | 3355319 B2 | 12/2002 |
| JP | 3355320 B2 | 12/2002 |
| JP | 3355321 B2 | 12/2002 |
| JP | 3361309 B2 | 1/2003 |
| JP | 2005-6274 A | 1/2005 |
| JP | 3737391 B2 | 1/2006 |
| JP | 4667364 B2 | 4/2011 |
| JP | 2011-130367 A | 6/2011 |
| WO | WO 2011/065287 A1 | 6/2011 |
| WO | WO 2012/120743 A1 | 9/2012 |
| WO | WO 2012/147753 A1 | 11/2012 |

* cited by examiner

Fig. 10

704 : SWITCHING TABLE

| USE STATE/INPUT PORT/INPUT CHANNEL | USE STATE/OUTPUT PORT/OUTPUT CHANNEL |
|---|---|
| USE/PORT1/CHANNEL1 | USE/PORT2/CHANNEL3 |
| USE/PORT1/CHANNEL2 | USE/PORT1/CHANNEL1 |
| USE/PORT1/CHANNEL3 | USE/PORT2/CHANNEL1 |
| USE/PORT1/CHANNEL4 | USE/PORT1/CHANNEL2 |
| NONUSE / (PORT1/CHANNEL5) | NONUSE |
| NONUSE / (PORT1/CHANNEL6) | NONUSE |
| NONUSE / (PORT1/CHANNEL7) | NONUSE |
| NONUSE / (PORT1/CHANNEL8) | NONUSE |
| USE/PORT2/CHANNEL1 | USE/PORT2/CHANNEL2 |
| USE/PORT2/CHANNEL2 | USE/PORT1/CHANNEL3 |
| USE/PORT2/CHANNEL3 | USE/PORT2/CHANNEL5 |
| USE/PORT2/CHANNEL4 | USE/PORT1/CHANNEL4 |
| NONUSE / (PORT2/CHANNEL5) | NONUSE |
| NONUSE / (PORT2/CHANNEL6) | NONUSE |
| NONUSE / (PORT2/CHANNEL7) | NONUSE |
| NONUSE / (PORT2/CHANNEL8) | NONUSE |

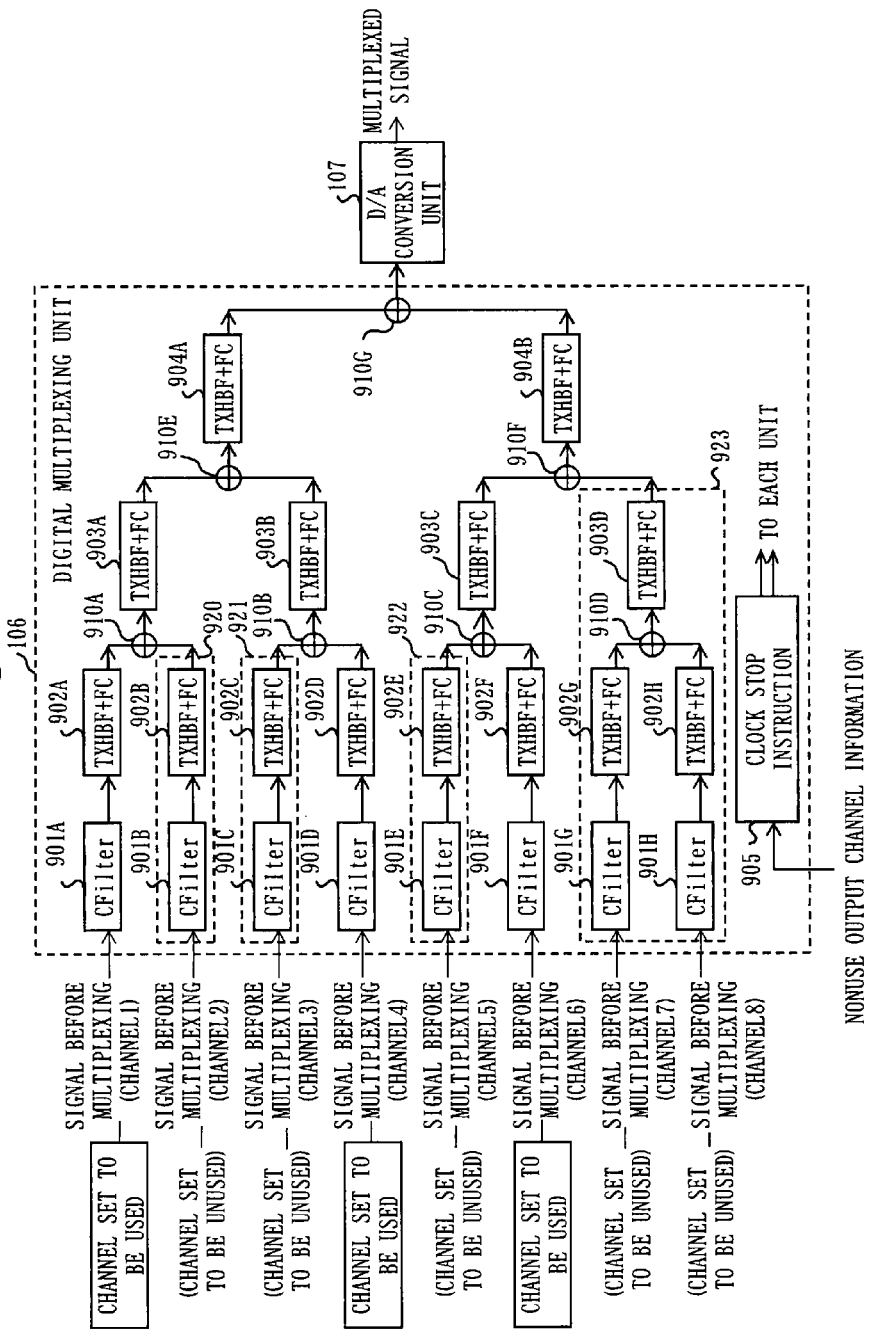

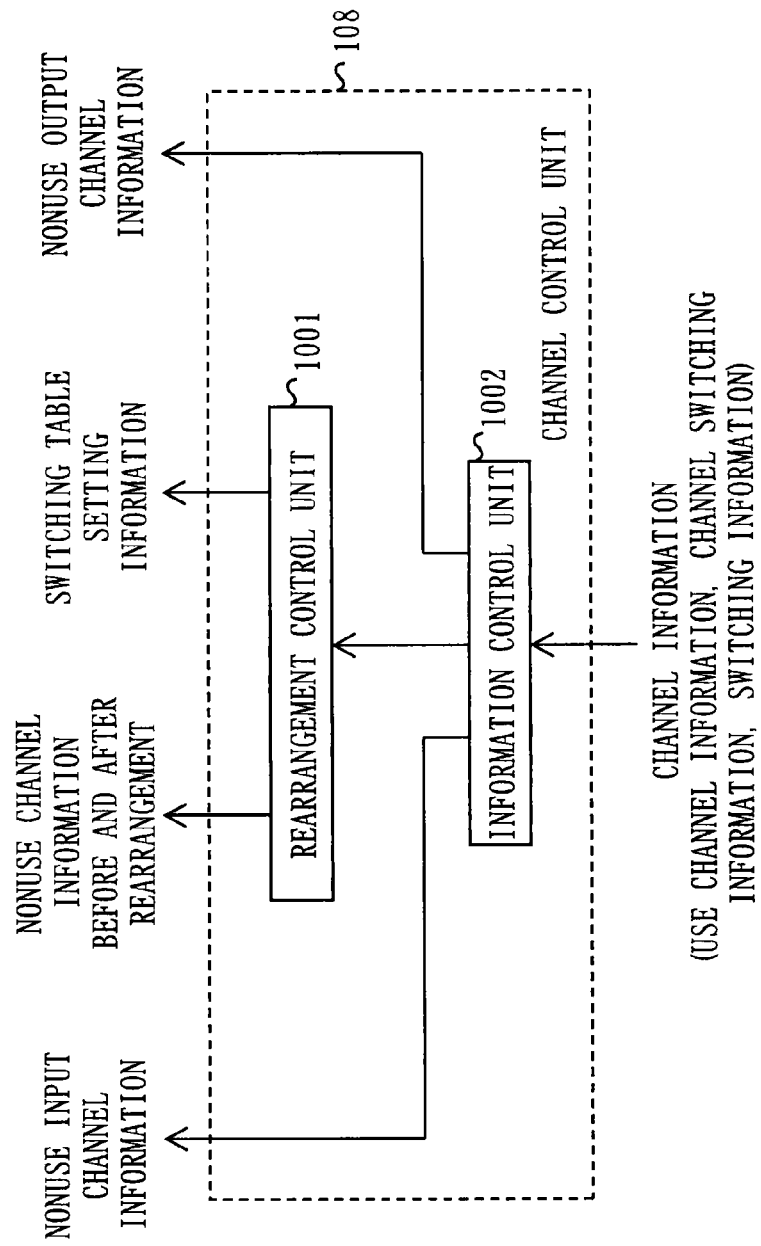

WIRELESS COMMUNICATION APPARATUS AND WIRELESS COMMUNICATION CONTROL METHOD THAT PERFORMS COMMUNICATION USING A FREQUENCY DIVISION MULTIPLEXING METHOD

TECHNICAL FIELD

The present invention relates to a wireless communication apparatus that performs communication using a frequency division multiplexing method and a wireless communication control method of the wireless communication apparatus. More specifically, the invention relates to a wireless communication apparatus for which reduction of power consumption and also failure resistance and high reliability are required, as in a case where the wireless communication apparatus is mounted on an artificial satellite or the like, and a wireless communication control method of the wireless communication apparatus.

BACKGROUND ART

In recent years, to cope with increasing sophistication of industry, life, and administration, a demand for wireless communication systems has increased. These wireless communication systems include a wireless communication system that performs wireless communication using the frequency division multiplexing method and a wireless communication system such as a satellite communication system, for example.

It is expected that these wireless communication systems will be utilized for disaster prevention and even at a time of a disaster. For this reason, a wireless communication system is requested which is reliably operated without failure, and moreover, which is operated in a degraded operation state in the event of a failure to allow provision of minimum necessary communication.

In these communication systems, however, maintenance or repair of a wireless communication apparatus mounted on a base station or an artificial satellite, in particular, is sometimes difficult. This is because there are a lot of base stations that perform signal transmission and reception with a terminal, and due to a reason for extensive transmission of an electric wave by each base station or the like, the base station including an antenna sometimes has no choice but to be installed in a location where maintenance is difficult.

In the case of the satellite communication system, the artificial satellite is on a satellite orbit over the earth after having been launched. Thus, if a failure has occurred, repair of the wireless communication apparatus involving physical replacement such as component replacement is difficult.

Let us further consider the satellite communication system. The wireless communication apparatus mounted on the artificial satellite is requested to be operable even if power consumption is low.

It is because apparatuses mounted on the artificial satellite are configured to operate on the satellite orbit using a solar battery panel, a battery, or the like and thus to share limited electric power among the respective apparatuses mounted on the artificial satellite. It is also because, even if supply power is reduced due to degradation of the solar battery panel or at a time of a failure of an electric power system, continuation of a communication service is desirable. In this way, even if power consumption is low, the wireless communication apparatus mounted on the artificial satellite is requested to operate as normally as possible, as a wireless communication apparatus.

As an example of the wireless communication apparatus mounted on the artificial satellite that is a target of the requests as mentioned above, there is a digital channelizer (see Patent Literature 1, for example). The digital channelizer is a satellite relay capable of flexibly accommodating a communication need or a change in demand after launching of the artificial satellite. There is also digital beam forming (DBF) (see Patent Literature 2, for example) capable of flexibly performing beam formation by performing digital signal processing when the beam formation is performed using an array antenna or the like.

An apparatus such as the digital channelizer or an apparatus for the DBF or the like has a digital signal processing mechanism that digitizes an analog signal and performs a frequency division or multiplexing process, a DBF operation, switching, and so forth for a digital signal. Then, these apparatuses such as the digital channelizer and the apparatus for the DBF or the like accommodate the need and the change in demand by utilizing flexibility of digital signal processing.

A description will be given about a case where the wireless relay including the digital channelizer is mounted on the artificial satellite and the satellite communication system is implemented, using the frequency division multiplexing method, for example.

In the case of such a satellite communication system, communication between the artificial satellite and a ground station in one hop is possible. Further, the satellite communication system has flexibility capable of readily performing addition or deletion of a service to a user.

However, a demand for provision of a service to a larger number of users and provision of a high-speed communication service by communication band expansion is increasing for such a satellite communication system. Communication capacities and signal processing scales of these wireless communication apparatuses such as the digital channelizer and the apparatus for the DBF therefore tend to increase.

To cope with the requests for the wireless communication apparatus as mentioned above, technologies in Patent Literatures 1 and 2 are disclosed.

Patent Literature 1 discloses an embodiment including the digital channelizer, a digital switch matrix, and a digital combiner as a digital payload. Further, a digital payload having three multi-port DSP processing slices including functions of these apparatuses is disclosed.

In a communication system, it is a common practice to set a part of all frequency bands that can be used by the system to be unused and to perform normal operation using a remainder of the frequency bands.

Patent Literature 2 discloses an embodiment in which this frequency band set to be unused is focused on to reduce power consumption of the wireless communication apparatus.

CITATION LIST

Patent Literature

Patent Literature 1: JP 4667364 (page 17, FIG. 6)
Patent Literature 2: JP 2011-130367 (page 11, FIG. 1)

SUMMARY OF INVENTION

Technical Problem

Patent Literature 1 and Patent Literature 2 have the following problem. That is, neither of Patent Literatures 1 and 2 has highly requested failure resistance and has means for providing minimum necessary communication using a degraded operation to accommodate a failure of an artificial satellite, because repair of a satellite communication system is difficult when the failure has occurred in the satellite communication system.

In a conventional wireless communication apparatus, a process for a frequency band set to be unused is stopped, thereby allowing reduction in power consumption of the apparatus. However, there is a problem as follows. That is, the effect of power consumption reduction depends on disposition of frequency bands to be used. In order to more improve the effect of power consumption reduction, consideration is necessary for usage patterns of the frequency bands to be used. When addition of a frequency band to be used or deletion of a frequency band is performed, flexible operation is difficult.

There is a problem that, when the process for the frequency band set to be unused is stopped and reduction in power consumption is performed in the conventional wireless communication apparatus, a method and means for implementation in consideration of both failure resistance and provision of minimum necessary communication using a degraded operation at a time of a system failure are not provided.

The present invention has been made to solve the problems as mentioned above. An object of the present invention is to provide a wireless communication apparatus and a control method of the wireless communication apparatus, wherein when a process for a frequency band set to be unused is stopped to reduce power consumption, the wireless communication apparatus may be operated without constraint against selection of a frequency band to be used in a system and may provide failure resistance and minimum necessary communication using a degraded operation at a time of a system failure.

Solution to Problem

A wireless communication apparatus according to the present invention is a wireless communication apparatus including a plurality of ports and a plurality of output ports respectively corresponding to the plurality of input ports, the wireless communication apparatus inputting, for each input port, an analog signal with a plurality of signals multiplexed thereon by a frequency division multiplexing method. The wireless communication apparatus may include:

an A/D conversion unit that is provided for each input port and converts the analog signal that has been input to a digital signal;

a demultiplexing unit that is provided for each input port, inputs the digital signal obtained by conversion by the A/D conversion unit, and separates the digital signal that has been input into the plurality of signals;

a prestage rearrangement unit that is provided for each input port, inputs the plurality of signals from the demultiplexing unit, and rearranges and outputs the plurality of signals that have been input as a plurality of prestage rearranged signals;

a switch unit that inputs the plurality of prestage rearranged signals output from the prestage rearrangement unit provided for each of the plurality of input ports as a plurality of signals before switching, applies switching processes to the plurality of signals before the switching that have been input, and outputs the plurality of signals before the switching with the switching processes applied thereto as a plurality of switched signals for each output port;

a poststage rearrangement unit that is provided for each output port, inputs the plurality of switched signals output from the switch unit for each output port, and rearranges the plurality of switched signals that have been input to be output as a plurality of poststage rearranged signals;

a multiplexing unit that is provided for each output port, inputs the plurality of poststage rearranged signals output from the poststage rearrangement unit, and multiplexes the plurality of poststage rearranged signals that have been input, by the frequency division multiplexing method; and a D/A conversion unit that is provided for each output port and converts the digital signal obtained by multiplexing by the multiplexing unit to an analog signal.

Advantageous Effects of Invention

In the wireless communication apparatus of the present invention, the prestage rearrangement unit is provided before the switch unit, and the poststage rearrangement unit is provided after the switch unit. Thus, even if a switching process for power consumption reduction is performed at the switch unit, a switching mismatch at the switch unit may be absorbed at the prestage rearrangement unit and the poststage rearrange unit. Thus, power consumption reduction of the switch unit having a large circuit size may be effectively performed.

BRIEF DESCRIPTION OF DRAWINGS

FIG. 10 is a table for explaining an example of a configuration of a switching table 704 used in the separating switch unit 104 of the wireless communication apparatus 100 according to the first embodiment.

FIG. 11 is a diagram for explaining an example of a configuration of a digital multiplexing unit 106 of the wireless communication apparatus 100 according to the first embodiment.

FIG. 12 is a diagram for explaining an example of a configuration of a channel control unit 108 of the wireless communication apparatus 100 according to the first embodiment.

DESCRIPTION OF EMBODIMENTS

First Embodiment

First, a description will be directed to a technology that provides basis for a wireless communication apparatus 100 according to this embodiment.

Figure 1:
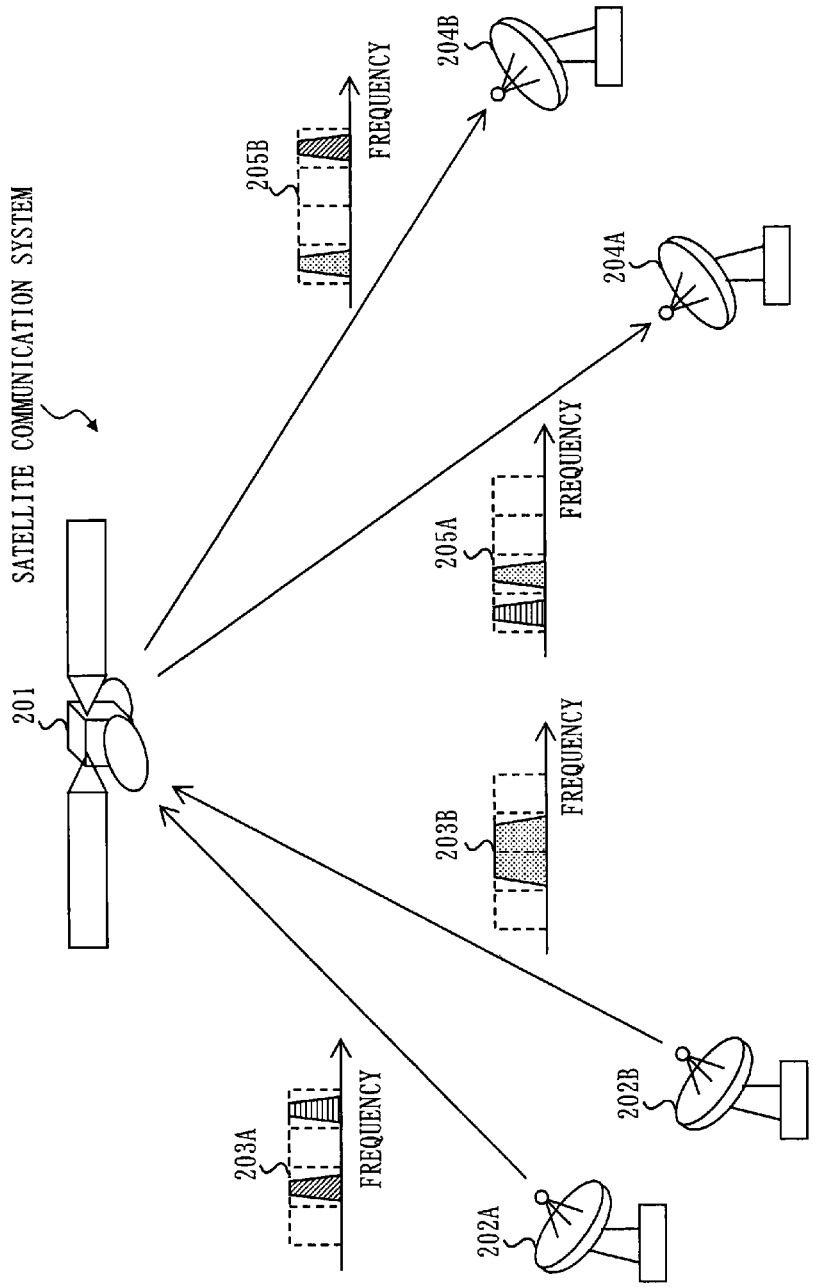
FIG. 1 is a diagram for explaining an operation example of a satellite communication system using a frequency division multiplexing method.

FIG. 1 is a diagram for explaining an operation example of a satellite communication system using a frequency division multiplexing method.

A description will be given about an outline of operation of the satellite communication system in which a wireless relay including a digital channelizer is mounted on an artificial satellite 201 and which performs wireless communication using the frequency division multiplexing method.

The satellite communication system illustrated in FIG. 1 includes the artificial satellite 201 with the wireless relay including the digital channelizer mounted thereon, a plurality of ground stations 202 (202A and 202B) on a transmission side, and a plurality of ground stations 204 (204A and 204B) on a receiving side.

The plurality of ground stations 202 transmit frequency division multiplexed signals 203 to the artificial satellite 201. The wireless relay including the digital channelizer mounted on the artificial satellite 201 executes digital signal processing on the received signals 203, rearranges resulting signals at predetermined frequencies, and transmits the rearranged signals to the plurality of ground stations 204 as frequency division multiplexed signals 205 (205A and 205B) again.

Hereinafter, a description such as the ground station 204 refers to both of the ground stations 204A and 204B or one of the ground stations 204A and 204B. It is assumed that the same holds true for the other reference numerals to which suffixes of A, B, and so forth have been given.

Next, two technologies for making comparison with the wireless communication apparatus 100 according to this embodiment will be described.

Figure 2:
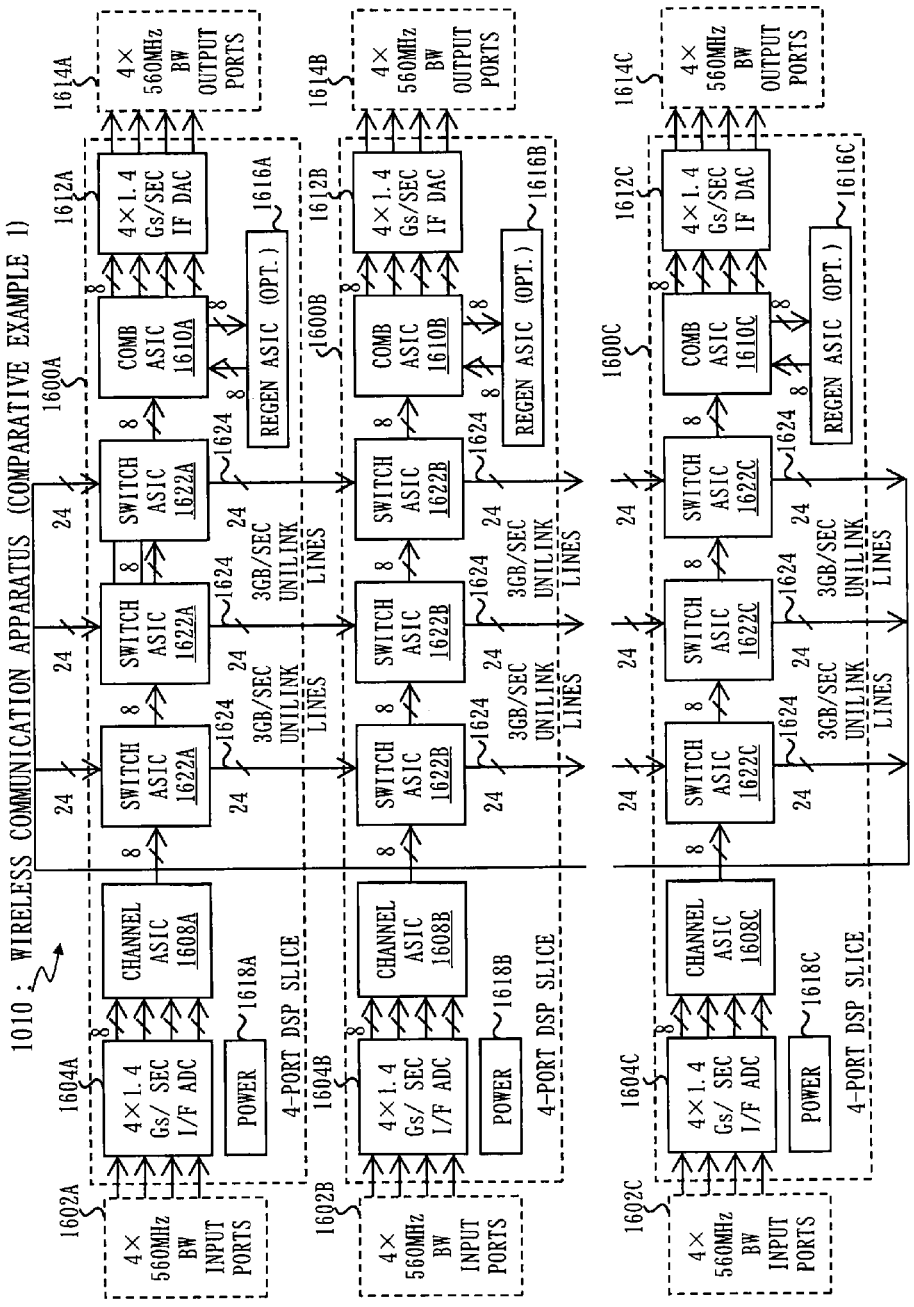
FIG. 2 is a diagram illustrating a wireless communication apparatus 1010 of Comparative Example 1 for comparing with a wireless communication apparatus 100 according to a first embodiment.

FIG. 2 is a diagram illustrating a wireless communication apparatus 1010 of Comparative Example 1 for comparing with the wireless communication apparatus 100 according to this embodiment.

Figure 3:
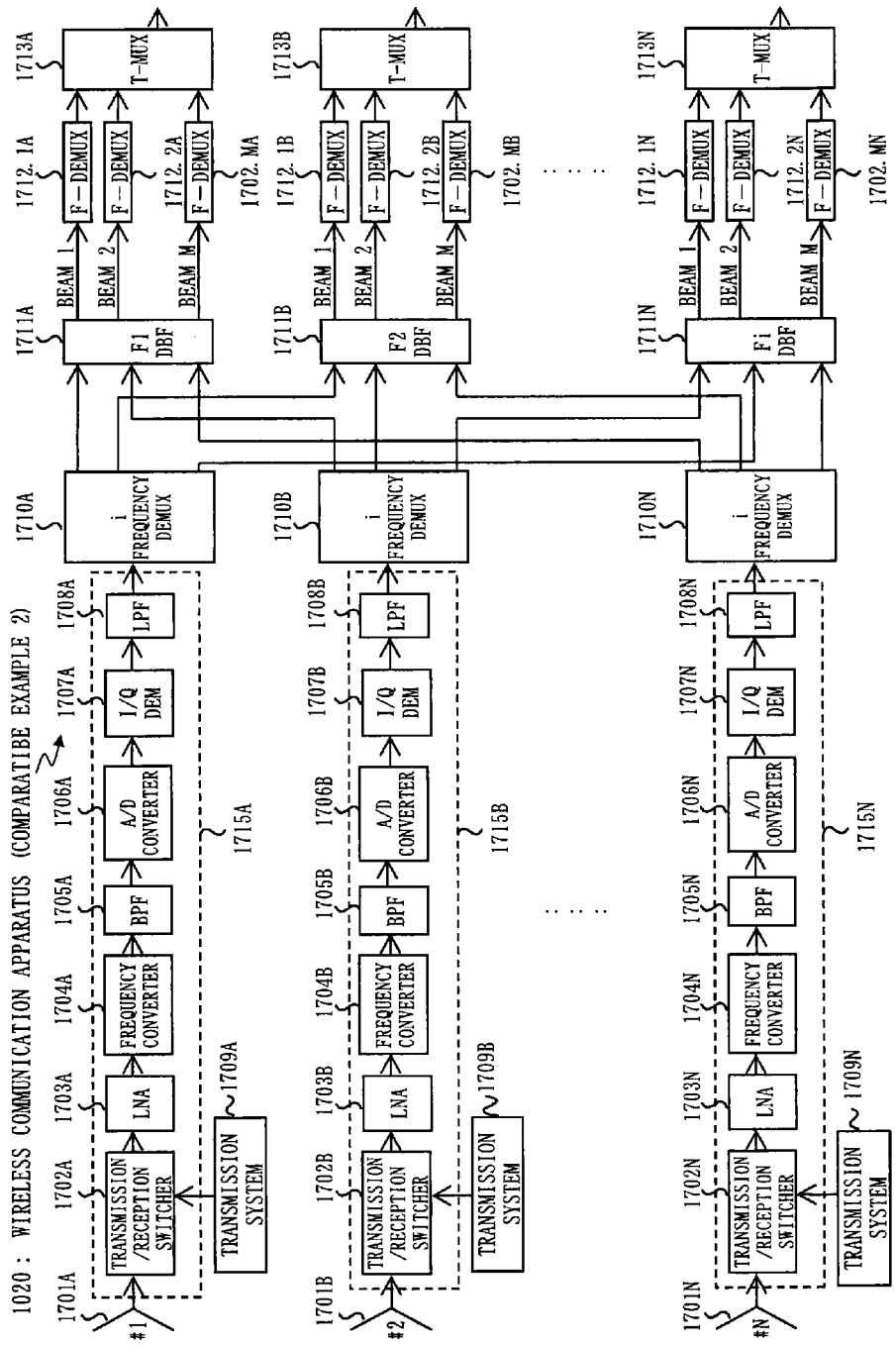
FIG. 3 is a diagram illustrating a wireless communication apparatus 1020 of Comparative Example 2 for comparing with the wireless communication apparatus 100 according to the first embodiment.

FIG. 3 is a diagram illustrating a wireless communication apparatus 1020 of Comparative Example 2 for comparing with the wireless communication apparatus 100 according to this embodiment.

The wireless communication apparatus 1010 of Comparative Example 1 includes a digital channelizer, a digital switch matrix, and a digital combiner, as a digital payload.

As illustrated in FIG. 2, the digital payload of the wireless communication apparatus 1010 includes three multi-port DSP processing slices each including functions of the digital channelizer, the digital switch matrix, and the digital combiner.

In the digital payload of the wireless communication apparatus 1010 illustrated in FIG. 2, a switching ASIC 1622 corresponds to the digital switch matrix. When an input is not output from a DSP slice 1600A or when the input is to be output from the DSP slice 1600A but cannot be output from the DSP slice 1600A due to internal contention, each switching ASIC 1622A included in the DSP slice 1600A in an uppermost stage transfers the input to a corresponding switching ASIC 1622B included in a DSP slice 1600B in a lower stage.

When an input is not output from the DSP slice 1600B or when the input is to be output from the DSP slice 1600B but cannot be output from the DSP slice 1600B due to internal contention, each switching ASIC 1622B transfers the input to a corresponding switching ASIC 1622C included in a DSP slice 1600C in a lowermost stage.

Further, when an input is not output from the DSP slice 1600C or when the input is to be output from the DSP slice 1600C but cannot be output from the DSP slice 1600C due to internal contention, each switching ASIC 1622C transfers the input to the corresponding switching ASIC 1622A included in the DSP slice 1600A in the uppermost stage.

The wireless communication apparatus 1010 in Comparative Example 1 operates as mentioned above. Thus, even if an input is not supplied to one of the DSP slices, for example, the switching ASIC included in the DSP slice to which the input is not supplied needs to transfer the input to the switching ASIC in a different one of the DSP slices. Consequently, the operation of the DSP slice to which the input is not supplied cannot be stopped, so that electric power to be consumed by this DSP slice to which the input is not supplied cannot be reduced.

The wireless communication apparatus 1020 of Comparative Example 2 focuses on a frequency band set to be unused, thereby reducing power consumption of the wireless communication apparatus 1020.

As illustrated in FIG. 3, the wireless communication apparatus 1020 includes a receiving module 1715 that amplifies, frequency-converts, cut the band of, and digitizes a received signal to form a baseband signal, a frequency demultiplexing channelizer 1710, a digital beam former 1711 that performs a product-sum operation using a weighting coefficient to form multiple beams, a digital channelizer 1712 that performs channel demultiplexing, and a time multiplexer 1713 that performs signal time-division multiplexing.

In Comparative Example 2 illustrated in FIG. 3, signals obtained by demultiplexing by frequency demultiplexing channelizers 1710A to 1710N are input to digital beam formers 1711A to 1711i set for respective frequencies. The wireless communication apparatus operates such that an operation by the beam former 1711 is not performed when all of the demultiplexed signals to be input to the beam former 1711 are set to be unused, thereby reducing electric power of the digital beam former 1711 associated with the frequency set to be unused. Each beam former 1711 handles the signals with the same frequency.

Comparative Example 2 operates as mentioned above. Thus, assume that, among frequency bands to be divided for all beams to be input, positions of the frequency bands to be used are disposed such that the number of the frequency bands being used in each of the frequency demultiplexing channelizer 1710A to 1710N is the same and the divided frequency bands are input to the same digital beam former 1711. Then, the highest effect of power consumption reduction is obtained.

However, assume that the above-mentioned condition is applied to the wireless relay including the digital channelizer as described by using FIG. 1. Then, when addition of a frequency for use or reduction of the frequency is performed due to addition of a new user or completion of the contract of an existing user, it is difficult to operate the wireless relay to constantly satisfy the condition that will increase the effect of power consumption reduction for all beams. For this reason, in Comparative Example 2, the effect of power consumption reduction is restricted in an actual operation.

Next, the wireless communication apparatus 100 according to this embodiment will be described, using the drawings.

Figure 4:
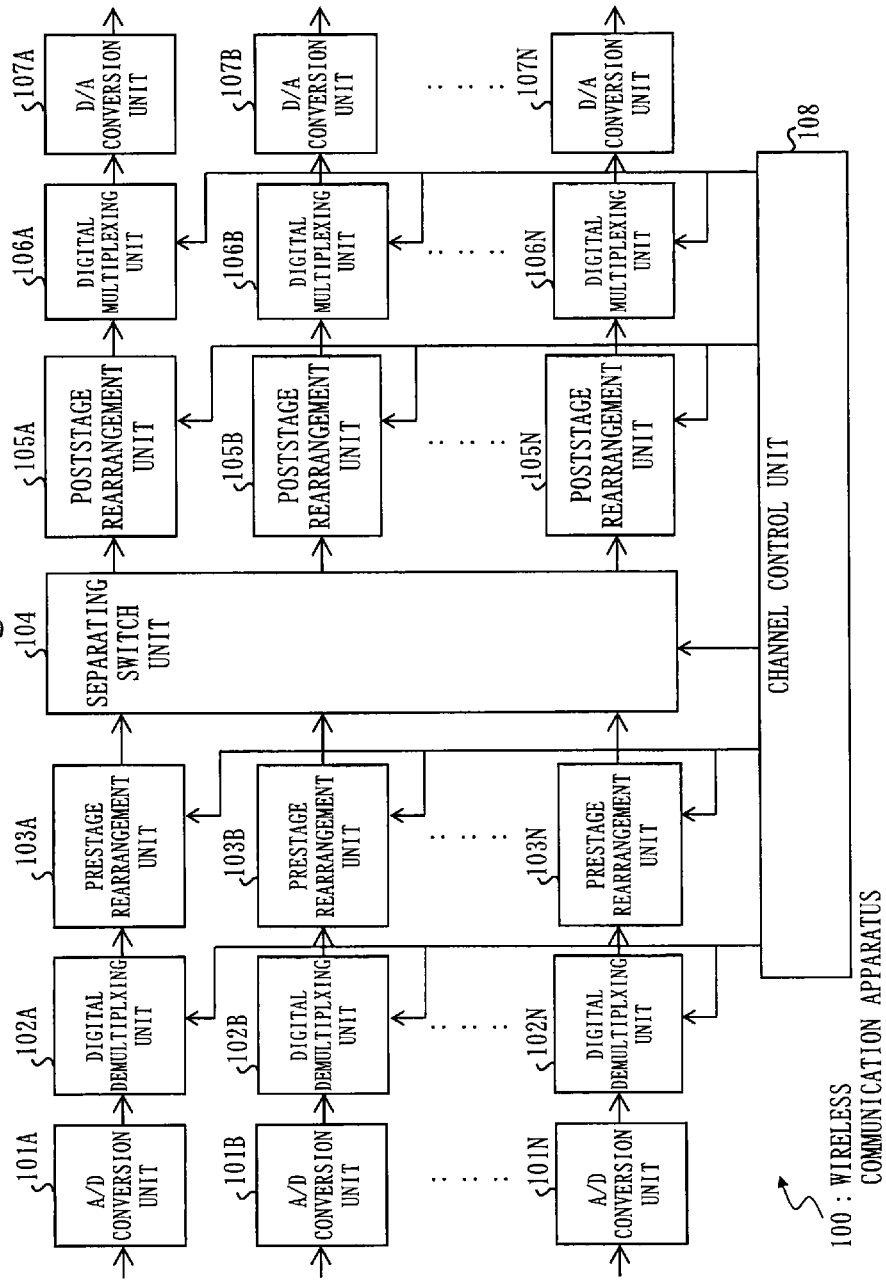
FIG. 4 is a diagram showing a configuration of the wireless communication apparatus 100 according to the first embodiment.

FIG. 4 is a diagram illustrating a configuration of the wireless communication apparatus 100 according to this embodiment.

The wireless communication apparatus 100 according to this embodiment is a wireless communication apparatus whereby communication processing is performed, using the frequency division multiplexing method.

The wireless communication apparatus 100 includes various facilities such as an antenna that transmits and receives an electric wave, an amplifier, an analog filter, and a facility that performs switching of a signal. However, herein, a description will be given about only a part of the processing by the wireless communication apparatus 100 related to digital signal processing.

As illustrated in FIG. 4, the wireless communication apparatus 10 includes an A/D conversion unit 101, a digital demultiplexing unit 102 (demultiplexing unit), a prestage rearrangement unit 103 (prestage channel rearrangement unit), a separating switch unit 104 (channel switch unit of channel separation type), a poststage rearrangement unit 105 (poststage channel rearrangement unit), a digital multiplexing unit 106 (multiplexing unit), and a D/A conversion unit 107.

Hereinafter, the configuration of the wireless communication apparatus 100 will be described in line with flows of signals received by the wireless communication apparatus 100.

An analog signal is input to the wireless communication apparatus 100 for each input port. The analog signal is a high-frequency signal in which an electric wave received through an antenna has been amplified, and then frequency selection and frequency conversion have been performed. A plurality of channel signals are multiplexed into this analog signal for each input port, using the frequency division multiplexing method.

The A/D conversion unit 101 receives the analog signal that has been input and converts the analog signal that has been input to a digital signal.

The digital demultiplexing unit 102 receives the signal (an example of the multiplexed signal) that has been converted to the digital signal, separates the channel signals from the frequency division multiplexed signal for respective frequencies, and frequency-converts each of the separated channel signals into an intermediate frequency for performing processing. Hereinafter, separation of channel signals for respective frequencies from a frequency division multiplexed signal may be described as "demultiplexing".

The prestage rearrangement unit 103 performs rearrangement of channels in the input port, according to an instruction from a channel control unit 108. The signals for which rearrangement of the channels has been performed are transmitted to the separating switch unit 104, together with the signals for which the same process has been performed in the other ports.

The A/D conversion unit 101, the digital demultiplexing unit 102, and the prestage rearrangement unit 103 are provided for each input port. To take an example, an A/D conversion unit 101A, a digital demultiplexing unit 102A, and a prestage rearrangement unit 103A are provided for an input port A, an A/D conversion unit 101B, a digital demultiplexing unit 102B, and a prestage rearrangement unit 103B are provided for an input port B, . . . an A/D conversion unit 101N, a digital demultiplexing unit 102N, and a prestage rearrangement unit 103N are provided for an input port N.

The separating switch unit 104 holds switching table setting information (setting information) instructed by the channel control unit 108 in a switching table 704 (see FIG. 9) inside the separating switch unit 104. The separating switch unit 104 switches the signals to respective output channels of a port from which the signals are to be output, based on the information in the switching table 704.

The poststage rearrangement unit 105 rearranges the channel signals to be output from the output port, based on an instruction from the channel control unit 108.

The digital multiplexing unit 106 performs frequency conversion of the signals for the respective channels, and performs frequency division multiplexing of the channel signals in the output port. Hereinafter, frequency division multiplexing of channel signals in an output port may be described as multiplexing.

The D/A conversion unit 107 performs digital-to-analog signal conversion of the multiplexed signal and outputs a converted signal from the output port.

The poststage rearrangement unit 105, the digital multiplexing unit 106, and the D/A conversion unit 107 are provided for each output port. To take an example, a poststage rearrangement unit 105A, a digital multiplexing unit 106A, and a D/A conversion unit 107A are provided for an output port A, a poststage rearrangement unit 105B, a digital multiplexing unit 106B, and a D/A conversion unit 107B are provided for an output port B, . . . , and a poststage rearrangement unit 105N, a digital multiplexing unit 106N, and a D/A conversion unit 107N are provided for an output port N.

Though not illustrated, the analog signal output from the D/A conversion unit 107 of the wireless communication apparatus 100 is thereafter output from the antenna through the signal switching facility, a frequency conversion facility, the filter, the amplifier, and so on.

Hereinafter, a configuration and operation of each unit that performs digital signal processing in the wireless communication apparatus 100 according to this embodiment will be described.

Figure 5:
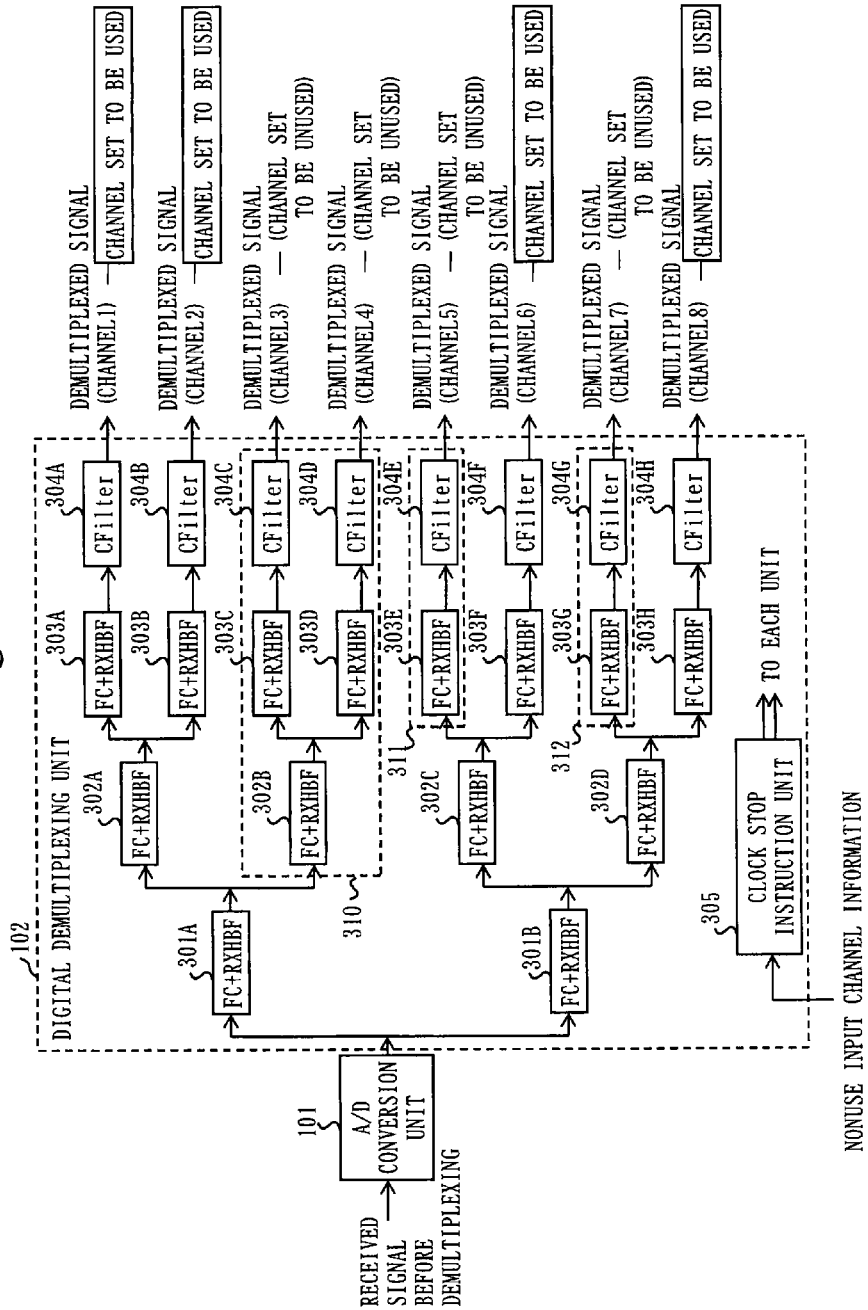
FIG. 5 is a diagram for explaining a configuration example of a digital demultiplexing unit 102 of the wireless communication apparatus 100 according to the first embodiment.

FIG. 5 is a diagram for explaining a configuration example of the digital demultiplexing unit 102 in the wireless communication apparatus 100 according to this embodiment.

Since the digital demultiplexing unit 102 needs to perform multirate demultiplexing, the digital demultiplexing unit 102 is configured by using a multirate filter bank. The filter bank having a configuration capable of separating a processing unit for each channel is used for the digital demultiplexing unit 102.

The digital demultiplexing unit 102 illustrated in FIG. 5 has the configuration in which the processing unit may be separated for each channel. The digital demultiplexing unit 102 illustrated in FIG. 5 is formed of three stages, and implements demultiplexing into up to eight waves. The demultiplexing may be implemented by a configuration formed of four or more stages.

The digital demultiplexing unit 102 illustrated in FIG. 5 is described in Patent Literature of "WO2011/065287 (A1)".

Referring to FIG. 5, the digital demultiplexing unit 102 includes frequency conversion and reception low-pass filter units (hereinafter referred to as low-pass filter units 301, 302, and 303) and a reception channel-filter unit 304.

Low-pass filter units 301A to 301B constitute a frequency conversion and reception low-pass filter unit in stage 1. Low-pass filter units 302A to 302D constitute a frequency conversion and reception low-pass filter unit in stage 2. Low-pass filter units 303A to 303H constitute a frequency conversion and reception low-pass filter unit in stage 3.

The low-pass filter units 301, 302, and 303 apply a frequency conversion process and a low-pass filter process to the digital signal subjected to the conversion by the A/D conversion unit 101, and then reduce a sampling rate thereof to half of an input data rate and output the processed signal.

The reception channel-filter unit 304 performs a filtering process for the output signal from the low-pass filter units 301, 302 and 303.

The low-pass filters of the low-pass filter units 301, 302, and 303 and the filter of the reception channel-filter unit 304 are each constituted from a half-band filter, for example. This may reduce the circuit size of the digital demultiplexing unit 102.

In the example in FIG. 5, the A/D conversion unit 101 samples the received signal and converts the received signal from the analog signal to the digital signal.

The digital demultiplexing signal 102 performs stepwise signal separation of the sampled digital signal, based on two-wave demultiplexing. The process of the signal separation by the digital demultiplexing unit 102 is performed by a method of dividing an extracted region into two regions as the number of stages increases.

The digital demultiplexing unit 102 includes channels 1 to 8 (demultiplexing unit channels 1 to 8) to which channel numbers have been assigned.

The digital demultiplexing unit 102 obtains from the channel control unit 108 information on the channel set to be unused. The digital demultiplexing unit 102 obtains the channel number of the channel set to be unused from among the channels of the demultiplexed signals (demultiplexing unit channels). With this arrangement, the digital demultiplexing unit 102 may stop clock supply to the low-pass filter units 301, 302, and 303 and the reception channel-filter unit 304 corresponding to the channel set to be unused, thereby allowing reduction of electric power to be consumed by this circuit.

Though the effect of stopping the circuit corresponding to the channel set to be unused is eliminated, this digital demultiplexing unit 102 may be configured by using polyphase filters and FFT.

It is assumed, for example, that channels 3, 4, 5, and 7 out of the channels to be subject to the processes by the digital demultiplexing unit 102 are set to be unused, as illustrated in FIG. 5.

In this case, electric power to be consumed by a range 310 of the frequency conversion and reception low-pass filter units and the reception channel-filter units that perform the processes for the channels 3 and 4 and is enclosed by a dotted line may be reduced.

Similarly, electric power to be consumed by each of a range 311 that performs the processes for the channel 5 and is enclosed by a dotted line and a range 312 that performs the processes for the channel 7 and is enclosed by a dotted line may also be reduced.

Next, the prestage rearrangement unit 103 and the poststage rearrangement unit 105 will be described.

Figure 6:
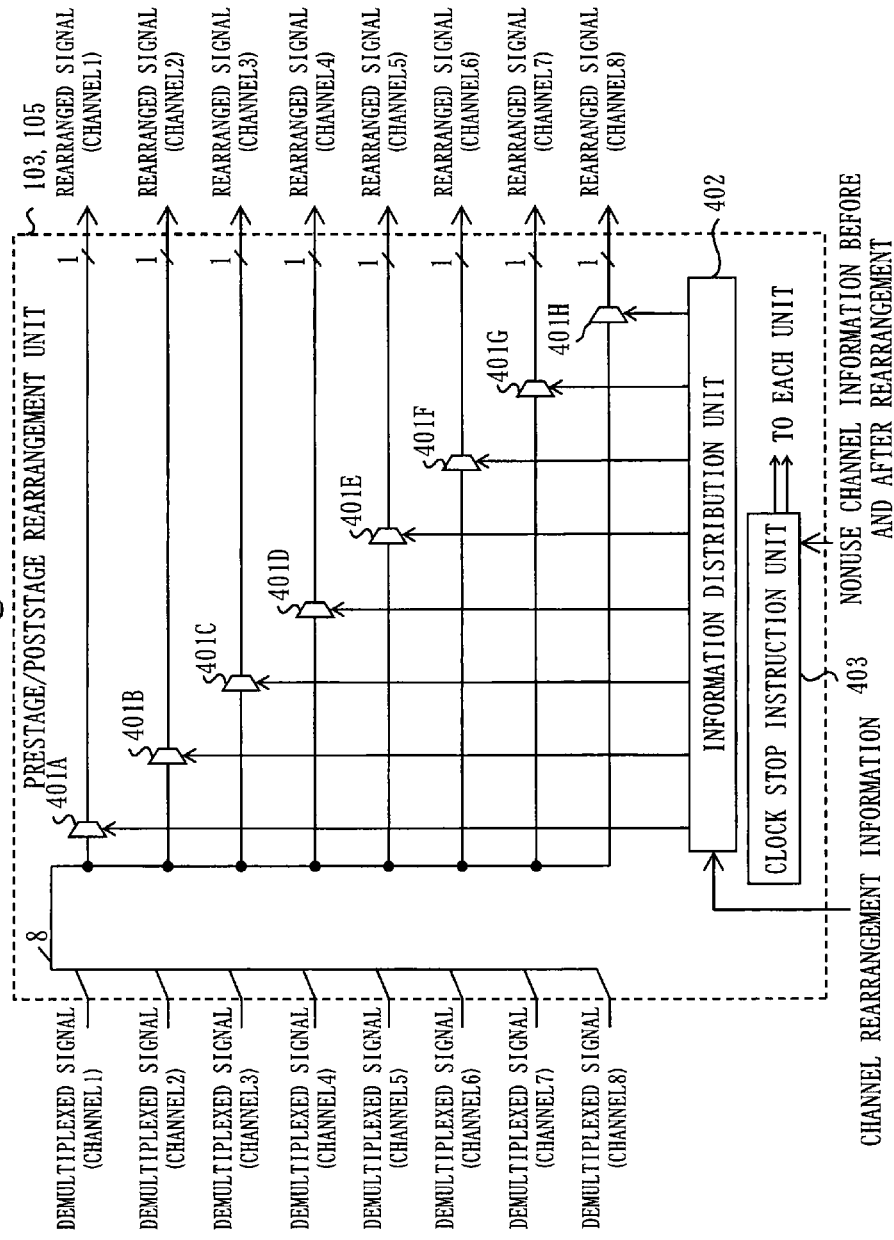
FIG. 6 is a diagram for explaining a configuration example of each of a prestage rearrangement unit 103 and a poststage rearrangement unit 105 of the wireless communication apparatus 100 according to the first embodiment.

FIG. 6 is a diagram for explaining a configuration example of each of the prestage rearrangement unit 103 and the poststage rearrangement unit 105 in the wireless communication apparatus 100 according to this embodiment.

Figure 7:
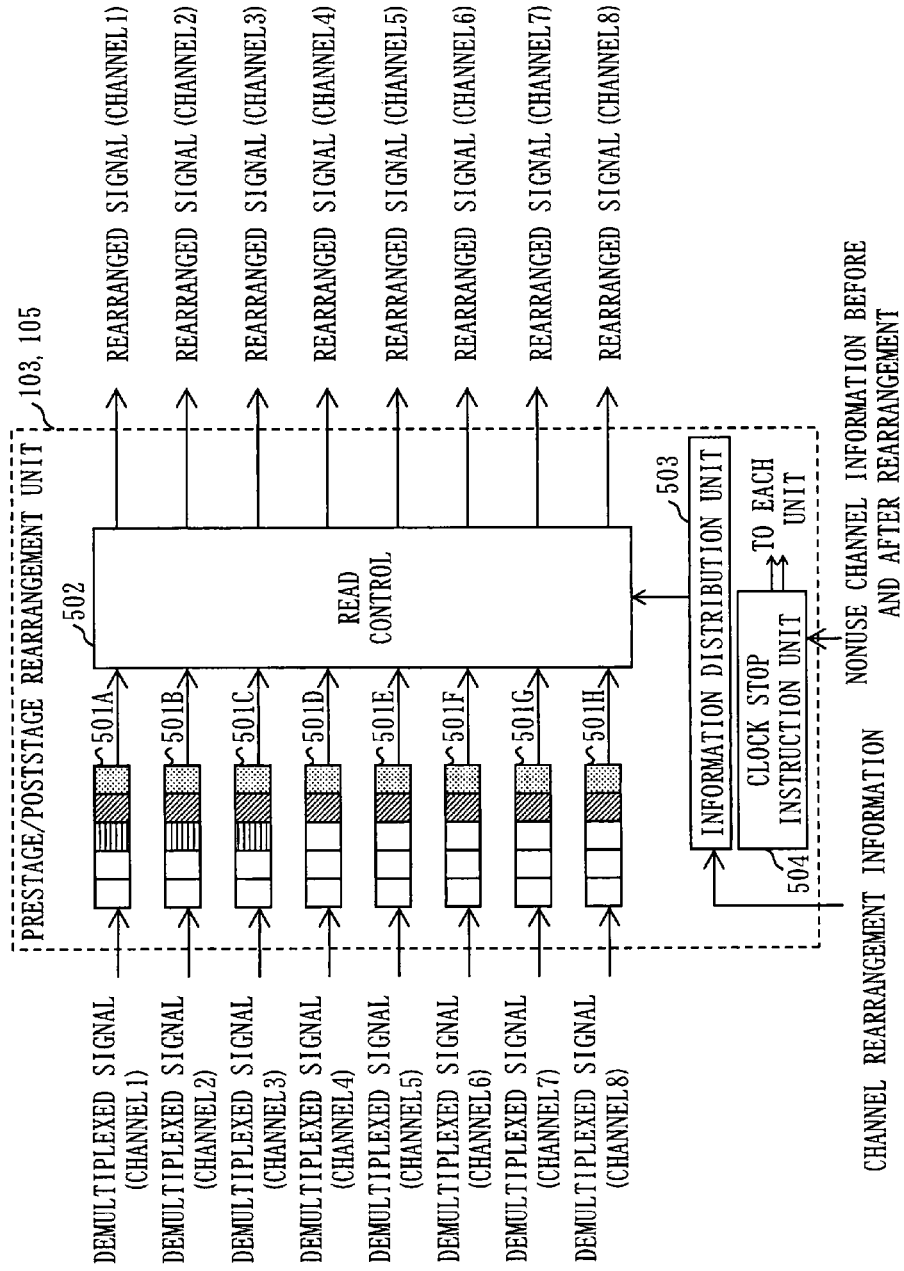
FIG. 7 is a diagram for explaining a different configuration example of each of the prestage rearrangement unit 103 and the poststage rearrangement unit 105 of the wireless communication apparatus 100 according to the first embodiment.

FIG. 7 is a diagram for explaining a different configuration example of each of the prestage rearrangement unit 103 and the poststage rearrangement unit 105 in the wireless communication apparatus 100 according to this embodiment.

Figure 8:
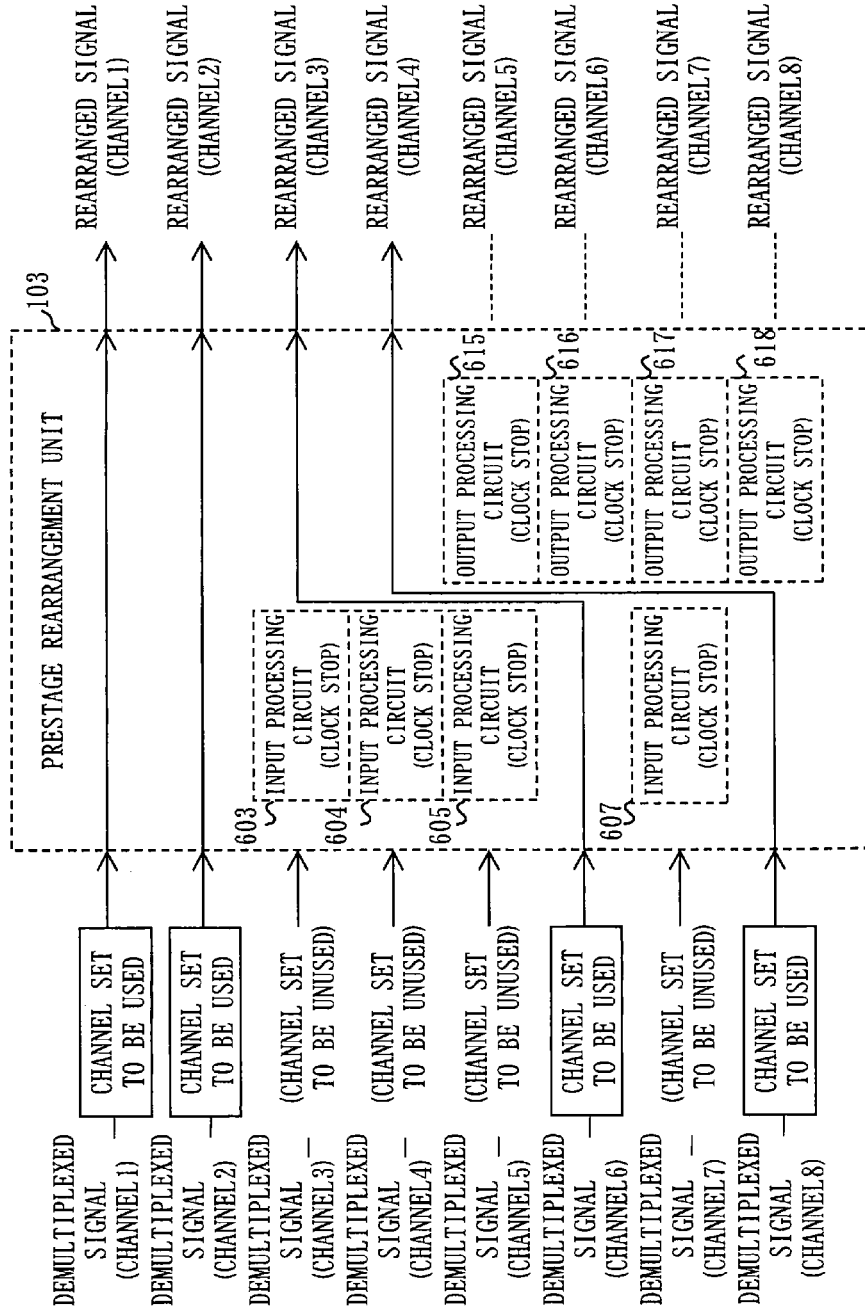
FIG. 8 is a diagram for explaining an operation example of the prestage rearrangement unit 103 of the wireless communication apparatus 100 according to the first embodiment.

FIG. 8 is a diagram for explaining an operation example of the prestage rearrangement unit 103 in the wireless communication apparatus 100 according to this embodiment.

The configuration and the operation of each of the prestage rearrangement unit 103 and the poststage rearrangement unit 105 will be described, using FIGS. 6, 7, and 8.

The prestage rearrangement unit 103 inputs the demultiplexed signals from the digital demultiplexing unit 102 and rearranges the demultiplexed signals that have been input to be output as rearranged signals (signals after prestage rearrangement).

The poststage rearrangement unit 105 inputs from the separating switch unit 104 the signals before the multiplexing (switched signals) output for the respective output ports and rearranges the signals before the multiplexing that have been input to be output as rearranged signals (signals after poststage rearrangement).

FIG. 6 illustrates an example where each of the prestage rearrangement unit 103 and the poststage rearrangement unit 105 is configured by using selectors when the channels obtained by demultiplexing are eight channels. The prestage rearrangement unit 103 and the poststage rearrangement unit 105 may be implemented by a same configuration. Though FIG. 6 illustrates the example where rearrangement of the eight channels is performed, a configuration that rearranges the channels other than the eight channels may be implemented. The prestage rearrangement unit 103 and the poststage rearrangement unit 105 may also be configured to perform the processes for the mutually different numbers of the channels.

As illustrated in FIG. 6, a selector 401 is provided corresponding to an output channel (prestage output channel) for which rearrangement is performed, at each of the prestage rearrangement unit 103 and the poststage rearrangement unit 105. That is, selectors 401A to 401H are provided, corresponding to output channels 1 to 8.

All the channels are input to each selector 401. To take an example, all the demultiplexed signals of the channels (prestage input channels) 1 to 8 on an input side are input to the selector 401A. The signal to be output to the output channel 1 is selected from among the demultiplexed signals that have been input, and is output to the output channel 1, as a rearranged signal.

Each of the prestage rearrangement unit 103 and the poststage rearrangement unit 105 includes an information distribution unit 402 (channel rearrangement information distribution unit) and a clock stop instruction unit 403.

The information distribution unit 402 inputs channel rearrangement information from the channel control unit 108, and outputs to the selector 401 a selection signal for causing the selector 401 to perform signal selection, based on the channel rearrangement information received.

The channel rearrangement information includes nonuse channel information before and after rearrangement indicating one or more of the channels set to be unused before and after the rearrangement.

Each output channel is determined, based on the channel rearrangement information (nonuse channel information before and after the rearrangement) input from the information distribution unit 402.

In this way, this selection signal for the selector, whereby the output channel is determined based on input of the nonuse channel information before and after the rearrangement, is distributed to the selector 401 by the information distribution unit 402.

With the arrangement as mentioned above, the prestage rearrangement unit 103 and the poststage rearrangement unit 105 may each rearrange one or more of the input channels, based on the nonuse channel information before and after the rearrangement, to be output as one or more of the output channels.

The clock stop instruction unit 403 inputs the nonuse channel information before and after the rearrangement from the channel control unit 108.

The clock stop instruction unit 403 instructs stop of a clock to a circuit that processes the signal before the rearrangement and a circuit that processes the signal after the rearrangement in each of the prestage rearrangement unit 103 and the poststage rearrangement circuit 105 based on the channel nonnuse information before and after the rearrangement.

Next, a description will be directed to the different configuration example of each of the prestage rearrangement unit 103 and the poststage rearrangement unit 105 in the wireless communication apparatus 100 according to this embodiment.

FIG. 6 illustrates the example where each of the prestage rearrangement unit 103 and the poststage rearrangement unit 105 is configured by using the selectors. A method of implementing rearrangement, however, does not have to be the method of using the selectors.

To take an example, each of the prestage rearrangement unit 103 and the poststage rearrangement unit 105 may separate each demultiplexed signal (channel signal) as a certain data block, and may perform rearrangement when reading is performed using a buffer (memory). When each of the prestage rearrangement unit 103 and the poststage rearrangement unit 105 divides data into certain data blocks, the division may be made for each data in a packet (or a frame or a cell) reproduced from the signal.

As illustrated in FIG. 7, each of the prestage rearrangement unit 103 and the poststage rearrangement unit 105 includes a read control unit 502, an information distribution unit 503 (channel rearrangement information distribution unit), and a clock stop instruction unit 504. Each of the prestage rearrangement unit 103 and the poststage rearrangement unit 105 further includes buffers 501A to 501H respectively corresponding to the channels 1 to 8.

Each of the prestage rearrangement unit 103 and the poststage rearrangement unit 105 writes into a buffer 501 data of the demultiplexed signal (channel signal) separated as the certain data block.

The read control unit 502 performs output while changing the read destination of the buffer from which reading is performed, based on the channel rearrangement information from the channel rearrangement information distribution unit 503, thereby performing channel rearrangement, and outputs the demultiplexed signal to the output channel.

Each of the buffers 501A to 501H does not have to be configured to be physically independent for each channel, as illustrated in FIG. 7.

To take an example, the buffers 501A to 501H may be physically configured by using a single memory for all the channels. When the demultiplexed signals are read from the buffers 501A to 50114, the address of the memory from which reading is performed is changed for each of the buffers 501A to 501H. With this arrangement, an operation equivalent to that of the configuration which is physically independent for each channel may be performed.

The clock stop instruction unit 504 inputs from the channel control unit 108 nonuse channel information before and after rearrangement.

The clock stop instruction unit 504 instructs stop of a clock to a circuit that processes the signal before the rearrangement and a circuit that processes the signal after the rearrangement, in each of the prestage rearrangement unit 103 and the poststage rearrangement circuit 105 based on the channel nonnuse information before and after the rearrangement.

Next, a specific operation of the prestage rearrangement unit 103 in the wireless communication apparatus 100 will be described, using FIG. 8.

It is assumed that the input channel 1, the input channel 2, the input channel 6, and the input channel 8 are set to be used as the input channels of the prestage rearrangement unit 103, as illustrated in FIG. 8.

Then, let us consider an example where channel rearrangement is performed by the prestage rearrangement unit 103 in order for the separating switch unit 104 in a poststage to perform power reduction for the channel 5, the channel 6, the channel 7, and the channel 8.

As will be described later, in the separating switch unit 104 divided into devices, power is supplied to only the devices to which the channels (successive channels 1 to 4 herein) set to be used are input, and the devices for the channels (channels 5 to 8 herein) set to be unused are turned off. With this arrangement, the effect of power consumption reduction may be improved. A mechanism for improving the effect of power consumption reduction in the separating switch unit 104 will be described later.

In this case, the prestage rearrangement unit 103 connects the input channel 1 to the output channel 1 and connects the input channel 2 to the output channel 2, without alteration. The input channel 6 is rearranged to be connected to the output channel 3, and the input channel 8 is rearranged to be connected to the output channel 4.

Each of the clock stop instruction units 403 and 504 of the prestage rearrangement unit 103 stops a clock to each of input processing circuits 603, 604, 605, and 607 that perform input processes for the input channel 3, the input channel 4, the input channel 5, and the input channel 7 that are the channels set to be unused.

Each of the clock stop instruction units 403 and 504 of the prestage rearrangement unit 103 stops a clock to each of output processing circuits 615, 616, 617, and 618 that perform output processes for the output channel 5, the output channel 6, the output channel 7, and the output channel 8 that are the channels set to be unused after the rearrangement.

By stopping the clock to each of the input processing circuits 603, 604, 605, and 607 and the output processing circuits 615, 616, 617, and 618 in this way, power reduction is performed.

Each of the clock stop instruction units 403 and 504 executes clock stop to one or more of the input processing circuits and one or more of the output processing circuits, based on nonuse channel information before and after rearrangement received from the channel control unit 108.

Herein, though the description has been given about the prestage rearrangement unit 103, the poststage rearrangement unit 105 may also be similarly operated.

Figure 9:
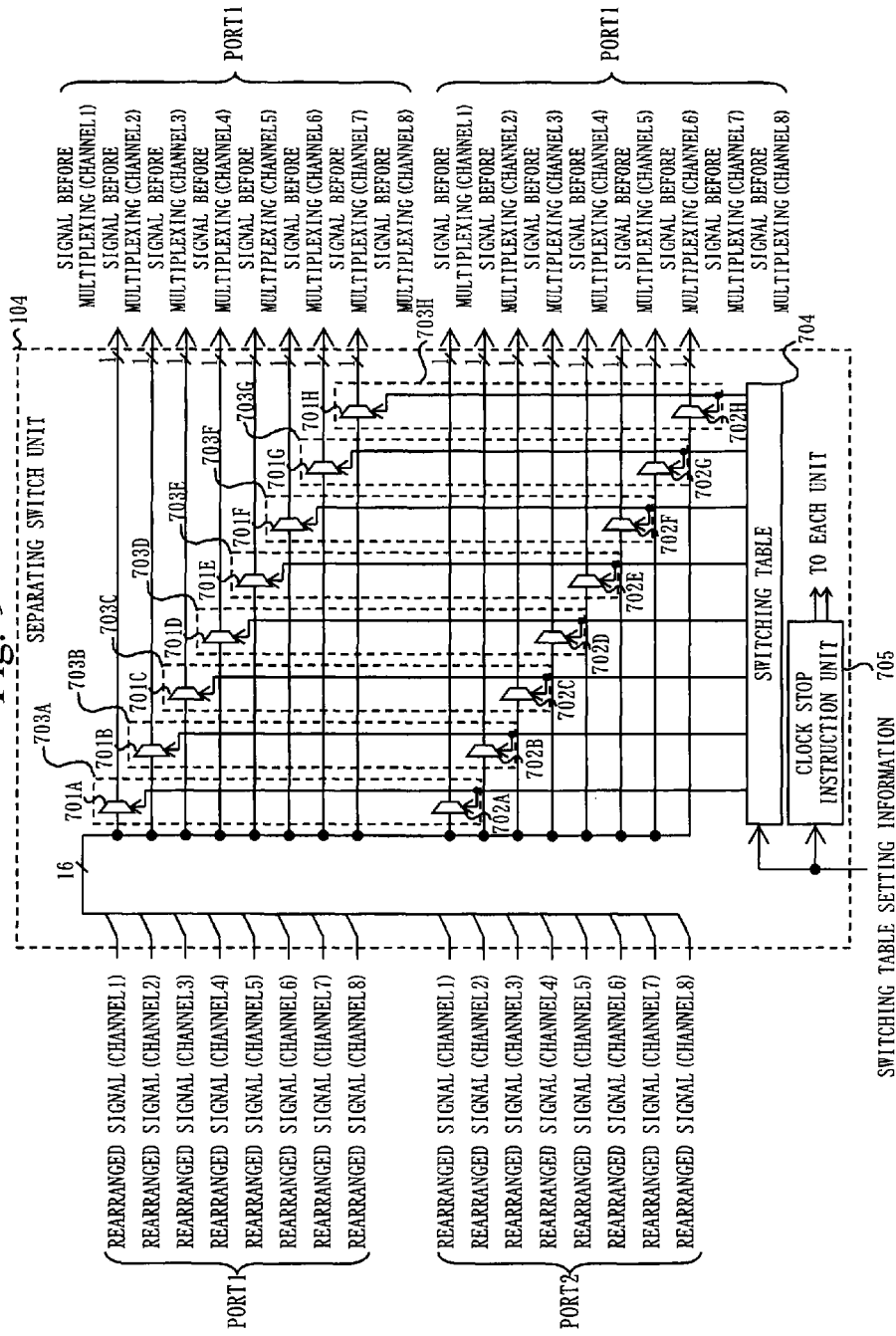
FIG. 9 is a diagram for explaining an example of a configuration of a separating switch unit 104 of the wireless communication apparatus 100 according to the first embodiment.

FIG. 9 is a diagram for explaining an example of a configuration of the separating switch unit 104 in the wireless communication apparatus 100 according to this embodiment.

The configuration of the separating switch unit 104 in the wireless communication apparatus 100 according to this embodiment will be described, using FIG. 9.

FIG. 9 illustrates a case where the rearranged signals for the eight channels corresponding to two ports are input to the separating switch unit 104. The separating switch unit 104 inputs the rearranged signals for eight channels corresponding to the two ports (input ports 1 and 2) for which rearrangement has been performed, executes switching operations for the input channels, and outputs the signals for eight channels before multiplexing corresponding to two output ports (output ports 1 and 2).

The separating switch unit 104 in FIG. 9 is configured by using selectors 701 and 702. The separating switch unit 104 also includes a switching table 704 and a clock stop instruction unit 705.

Selectors 701A to 701H are selectors each of which selects the channel signal for the output port 1. Selectors 702A to 702H are selectors each of which selects the channel signal for the output port 2. Devices 703A to 703H are an example of the devices obtained by division of the selecting switch unit 104.

It is assumed that when the selector is described as the selector 701 or 702, the selector means all or at least one of the selectors 701A to 701H or all or at least one of the selectors 702A to 702H.

The number of the channels and the number of the ports do not need to be limited to these numbers. The separating switch unit 104 may be implemented by the number of the channels and the number of the ports which are larger than these numbers. The separating switch unit 104 may also be implemented by a configuration similar to that in FIG. 7 illustrating the configuration example of each of the prestage rearrangement unit 103 and the poststage rearrangement unit 105. By using buffers (memories) and using a method of implementing switching by control at a time of reading, the separating switch unit 104 of this configuration may be implemented.

As illustrated in FIG. 9, the selectors are provided, corresponding to the output channels that performs output by execution of switching. The selectors 701A to 701H for the output port 1 and the selectors 702A to 702H for the output port 2 are provided at the separating switch unit 104. Each selector is so configured that all the channels of all the input ports are input to the selector.

The rearranged signals (signals before switching) of input channels (switch unit input channels) 1 to 8 for the input port 1 and the rearranged signals (signals before switching) of the input channels (switch unit input channels) 1 to 8 for the input port 2 are input to the selector 701A, for example. The selector 701A inputs a switch selection signal from the switching table 704. The selector 701A selects one signal from all of the rearranged signals that have been input, based on the switch selection signal that has been input, and outputs the selected signal to an output channel (switch unit output channel) 1 of the output port 1 as the signal before the multiplexing.

A switch selection signal to be output to each of the selectors 701 and 702 is generated based on the switching table setting information set in the switching table 704. Each selector executes switching including an output port change based on the switch selection signal. Herein, the switching table 704 is set so that selection of one or more of the output channels in each output port is made to reduce power consumption of the separating switch unit 104 in particular.

The separating switch unit 104 inputs the switching table setting information from the channel control unit 108. The switching table setting information is input to the switching table 704 and the clock stop instruction unit 705.

The clock stop instruction unit 705 instructs clock stop to a processing circuit for each channel set to be unused before switching and a processing circuit for each channel set to be unused after the switching, based on the switching table setting information that has been input.

Since all input channel information is input to each of the selectors 701 and 702 in the separating switch unit 104, the circuit size tends to increase.

In the above description, a case where the separating switch unit 104 is accommodated in one device has been assumed, and an example has been given where the clock stop to each channel set to be unused is executed.

The separating switch unit 104, however, may be divided into a plurality of devices to be accommodated, according to the circuit size.

When division into the devices is performed, the division is performed by a method of selecting a same channel number for each port and implementing each device using the same channel number, as in each of ranges 703A to 703H enclosed by a dotted line in FIG. 9, for example. Specifically, the selector 701A corresponding to the output channel 1 for the output port 1 and the selector 702A corresponding to the output channel 1 for the output port 2 are implemented in one device 703A. The selector 701B corresponding to an output channel 2 for the output port 1 and the selector 702B corresponding to an output channel 2 for the output port 2 are implemented in one device 703B.

When the division into the devices is performed as mentioned above, power consumption is reduced by turning off power supply for each device.

A channel switch (separating switch unit 104) according to this embodiment has a configuration in which processing may be independently performed for each channel, and power consumption reduction may be performed for each channel. Thus, the channel switch according to this embodiment is referred to as a separating channel switch. With respect to the division method when this division into the devices is performed, not only the method of division for each channel but also a method of accommodating the devices 703A and 703B as one device, a method of accommodating the devices 703A, 703B, 703C, and 703D as one device, or the like may be used.

It may also be so arranged that device division between an input side and an output side is performed, and that power consumption is reduced by stopping power to a device set to be unused on each of the input side and the output side. In this case, however, an output of each device on the input side of the separating switch unit needs to be connected to all devices on the output side. Thus, in the case of a wireless communication apparatus having a large number of channels in particular, a lot of wirings between the devices on the input side and the output side are needed, thus making it difficult to routing the wirings. Thus, the above-mentioned division method is not usually performed.

FIG. 10 is a table for explaining an example of a configuration of the switching table 704 used in the separating switch unit 104 of the wireless communication apparatus 100 according to this embodiment.

The configuration of the switching table 704 will be described, using FIG. 10.

As illustrated in FIG. 10, the switching table 704 holds, as information on each input channel before switching, information on use or nonuse of the input channel, information on the input port of the input channel, and information on the input channel. The switching table 704 also holds, as information on each output channel after the switching, which corresponds to the input channel, information on use or nonuse of the output channel, information on the output port of the output channel, and information on the output channel. Hereinafter, the information on the use or the nonuse of each input channel for switching, the information on the user or the nonuse of each output channel for switching, and the information indicating switching of the input and output ports and the channels are generically described as switching information.

To take an example, a signal input to the input channel of "use/port 1/channel 1" is output to the output channel of "use/port 2/channel 3". A signal input to the input channel of "use/port 1/channel 2" is output to the output channel of "use/port 1/channel 1".

In this way, the switching information is set in the switching table 704 so that switching processes are performed across the input ports 1 and 2.

Though the switching table 704 illustrated in FIG. 10 has a configuration of a table based on the input channels, the switching table 704 may have a configuration of a table based on the output channels. Alternatively, a table configuration, in which each channel set to be unused is not set, and only each channel set to be used is set, may be used for the switching table 704.

Connection information on input and output channels is described in a switching table in a usual channel switch.

The switching table 704 according to this embodiment is updated by the channel control unit 108 so that the effect of reducing power consumption by the separating switch unit 104 is enhanced.

Specifically, the channel control unit 108 alters connection information between the input channels and the output channels set in the switching table 704 so that a power consumption amount of the separating switch unit 104 is minimized.

The channel control unit 108 alters content of the switching table 704 so that the separating switch unit 104 has the largest number of clock stops, or a proportion of the circuits of the channel switch divided into the devices to which power supply is stopped becomes the largest.

The channel control unit 108 is operated to update the content of the switching table 704 together with the channel rearrangement processes of the prestage rearrangement unit 103 and the poststage rearrangement unit 105, thereby maintaining original connections between the input channels and the output channels.

The separating switch unit 104 outputs the signals before the multiplexing for each output port, based on the switching table 704.

The poststage rearrangement unit 105 inputs the signals before the multiplexing for each output port, and executes the channel rearrangement. In this case, the poststage rearrangement unit 105 executes the channel rearrangement according to the selection signal from the information distribution unit 402, as explained in FIG. 6.

The poststage rearrangement unit 105 rearranges channels of the signals before the multiplexing, and outputs resulting signals as a plurality of signals before the multiplexing.

FIG. 11 is a diagram for explaining an example of a configuration of the digital multiplexing unit 106 (multiplexing unit) of the wireless communication unit 100 according to this embodiment.

The configuration and operation of the digital multiplexing unit 106 of the wireless communication apparatus 100 according to this embodiment will be described, using FIG. 11. Herein, the description will be given about a case where the digital multiplexing unit 106 multiplexes signals of eight channels before multiplexing (an example of the signals after poststage rearrangement).

The signal of each channel before the multiplexing output from the poststage rearrangement unit 105 to the channel to which the signal should originally be output is input to a filter unit 901 (transmission channel-filter unit), where a filter process is performed.

Next, the signal for which the filter process has been performed is input to transmission low-pass filter units 902, 903, and 904 (transmission low-pass filter frequency conversion unit).

The filter unit 901 is the transmission channel-filter unit. Transmission low-pass filter units 902A to 902H constitute a transmission low-pass filter frequency conversion unit in stage 1. Transmission low-pass filter units 903A to 903D constitute a transmission low-pass filter frequency conversion unit in stage 2. Transmission low-pass filter units 904A and 904B constitute a transmission low-pass filter frequency conversion unit in stage 3.

The transmission low-pass filter unit 902 interpolates a sampling rate of the signal that has been input to twice of an input data rate, and then performs frequency conversion and outputs the processed signal.

Addition of the output signal output from the transmission low-pass filter unit 902 is carried out in adjacent bands by an adder 910.

The addition process as mentioned above is repeated by using the transmission low-pass filter units 903 and 904 and the adder 910.

Then, the signal obtained by adding output signals output from transmission low-pass filter units 904A and 904B by an adder 910G is input to the D/A conversion unit 107.

The digital multiplexing unit 106 illustrated in FIG. 11 is described in Patent Literature of "WO2011/065287 (A1)". Each filter of the transmission channel-filter unit 901, the transmission low-pass filter units 902, 903, and 904 may be formed of a half-band filter, for example, as in the digital demultiplexing unit 102, so that the circuit size may be reduced.

By configuring the digital multiplexing unit 106 as mentioned above and obtaining information on the channel set to be unused as in the digital demultiplexing unit 102, clock supply to the transmission channel-filter unit 901 and the transmission low-pass filter units 902, 903, and 904 corresponding to the channel set to be unused may be stopped. Electric power to be consumed by this circuit may be thereby reduced.

FIG. 11 illustrates a case where channels 1, 4, and 6 are output channels set to be used. In this case, a circuit clock to each of a processing circuit 920 for a channel 2 set to be unused, a processing circuit 921 for a channel 3 set to be unused, a processing circuit 922 for a channel 5 set to be unused, a processing circuit 923 for channels 7 and 8 set to be unused may be stopped. Power consumption may be thereby reduced.

Though the effect of stopping the circuit corresponding to the channel set to be unused is eliminated, the digital multiplexing unit 106 may be configured by using polyphase filters and IFFT.

FIG. 12 is a diagram for explaining an example of a configuration of the channel control unit 108 in the wireless communication apparatus 100 according to this embodiment.

The configuration of the channel control unit 108 will be described, using FIG. 12.

The channel control unit 108 includes an information control unit 1002 (channel information control unit) and a rearrangement control unit 1001 (channel rearrangement control unit), as illustrated in FIG. 12.

Channel information is supplied to the channel control unit 108.

When the wireless communication apparatus 100 according to this embodiment is mounted on the artificial satellite 201 (see FIG. 1), the channel information may be given as a command instructing channel setting from one of the ground stations.

The channel information includes information on one or more of the channels set to be used in the wireless communication apparatus 100 (use channel information) and information for channel switching (channel switching information).

The information on the one or more of the channels set to be used includes information on one or more of the input channels set to be used and one or more of the output channels set to be used in the wireless communication apparatus 100.

The channel information is input to the information control unit 1002 of the channel control unit 108.

The information control unit 1002 selects information on one or more of the input channels set to be unused, based on the information on the one or more of the input channels set to be used that is included in the information on the one or more of the channels set to be used, and transmits the selected information to the digital demultiplexing unit 102 as nonuse input channel information.

The input channels are channels before rearrangement and switching processes.

The information control unit 1002 selects information on one or more of the output channels set to be unused, based on the information on the one or more of the output channels set to be used that is included in the information on the one or more of the channels set to be used, and transmits the selected information to the digital multiplexing unit 106 as nonuse output channel information.

The output channels are channels after the switching and rearrangement processes.

The information control unit 1002 alters information on channel switching, based on the information for the channel switching so that power consumption of the separating switch unit 104 becomes the smallest. The information control unit 1002 transmits to the rearrangement control unit 1001 the altered information on the channel switching.

The rearrangement control unit 1001 inputs the altered information on the channel switching from the information control unit 1002, and generates switching table setting information to be set in the switching table 704, based on the altered information on the channel switching. The rearrangement control unit 1001 transmits the generated switching table setting information to the separating switch unit 104.

When the information control unit 1002 alters the information on the channel switching, mismatching occurs between the input channels actually used and the output channels actually used. However, the rearrangement control unit 1001 generates nonuse channel information before and after the rearrangement so that the mismatching is solved by the rearrangement by each of the prestage rearrangement unit 103 and the poststage rearrangement unit 105.

The rearrangement control unit 1001 generates the nonuse channel information for the rearrangement between the input channels of the prestage rearrangement unit 103 and the channels on the input side of the separating switch unit 104, and transmits the generated nonuse channel information to the prestage rearrangement unit 103.

The rearrangement control unit 1001 generates the nonuse channel information for the rearrangement between the output channels of the poststage rearrangement unit 105 and the channels on the output side of the separating switch unit 104, and transmits to the poststage rearrangement unit 105 the generated nonuse channel information.

The nonuse channel information before and after the rearrangement is not necessarily needed by each of the prestage rearrangement unit 103 and the poststage rearrangement unit 105, depending on the configurations of the prestage rearrangement unit 103 and the poststage rearrangement unit 105. There is a case where the nonuse channel information before the rearrangement is needed or there is a case where the nonuse channel information after the rearrangement is needed.

As mentioned above, after receiving the altered information on the channel switching from the information control unit 1002, the rearrangement control unit 1001 transmits to each of the prestage rearrangement unit 103 and the poststage rearrangement unit 105 the information for the channel rearrangement and the nonuse channel information before and after the rearrangement.

The above description has been directed to the configuration of the wireless communication apparatus 100 according to this embodiment and the components of the configuration. The components of the wireless communication apparatus 100 according to this embodiment are each constituted from one or more electronic circuits such as ASICs (Application•Specific•Integrate•Circuits) or FPGAs (Field•Programmable•Gate•Arrays) in order to perform digital processing.

The components each of which forms the electronic circuit having a large configuration size and consumes large power are the digital demultiplexing unit 102, the separating switch unit 104, and the digital multiplexing unit 106.

The digital demultiplexing unit 102 forms the electronic circuit having the large configuration size because the digital demultiplexing unit 102 demultiplexes the channel signals from the frequency multiplexed signals at high speed. The digital multiplexing unit 106 multiplexes the channel signals at high speed. Thus electronic circuits whose number corresponds to the number of the channels are needed, so that the digital multiplexing unit 106 forms the electronic circuit with the large configuration size. The separating switch unit 104 performs switching operations both between the ports and between the channels. Thus, inputs (of the number of ports×the number of channels) in number are needed for the channel switching process of one channel. The configuration size of the electronic circuit that performs the processes for switching a lot of the input channels therefore increases.

On contrast therewith, each of the prestage rearrangement unit 103 and poststage rearrangement unit 105 receives inputs whose number is equal to the number of the channels accommodated in one input port. Thus, the configuration size of the electronic circuit for each of the prestage rearrangement unit 103 and poststage rearrangement unit 105 is smaller than that of the separating switch unit 104.

In the wireless communication apparatus 100 according to this embodiment, the digital demultiplexing unit 102, the separating switch unit 104, and the digital multiplexing unit 106 whose configuration sizes may increase are each configured to allow the process to be performed, for each channel. Then, by stopping power supply and clock distribution to the electronic circuit that does not operate, power reduction is performed.

The prestage rearrangement unit 103 and the poststage rearrangement unit 105 perform channel rearrangement in order to maximize the effect of power consumption reduction in the separating switch unit 104.

The channel control unit 108 performs rearrangement control over the prestage rearrangement unit 103 and the poststage rearrangement unit 105 so that power consumption is the smallest in the separating switch unit 104 where power consumption is especially high.

Figure 13:
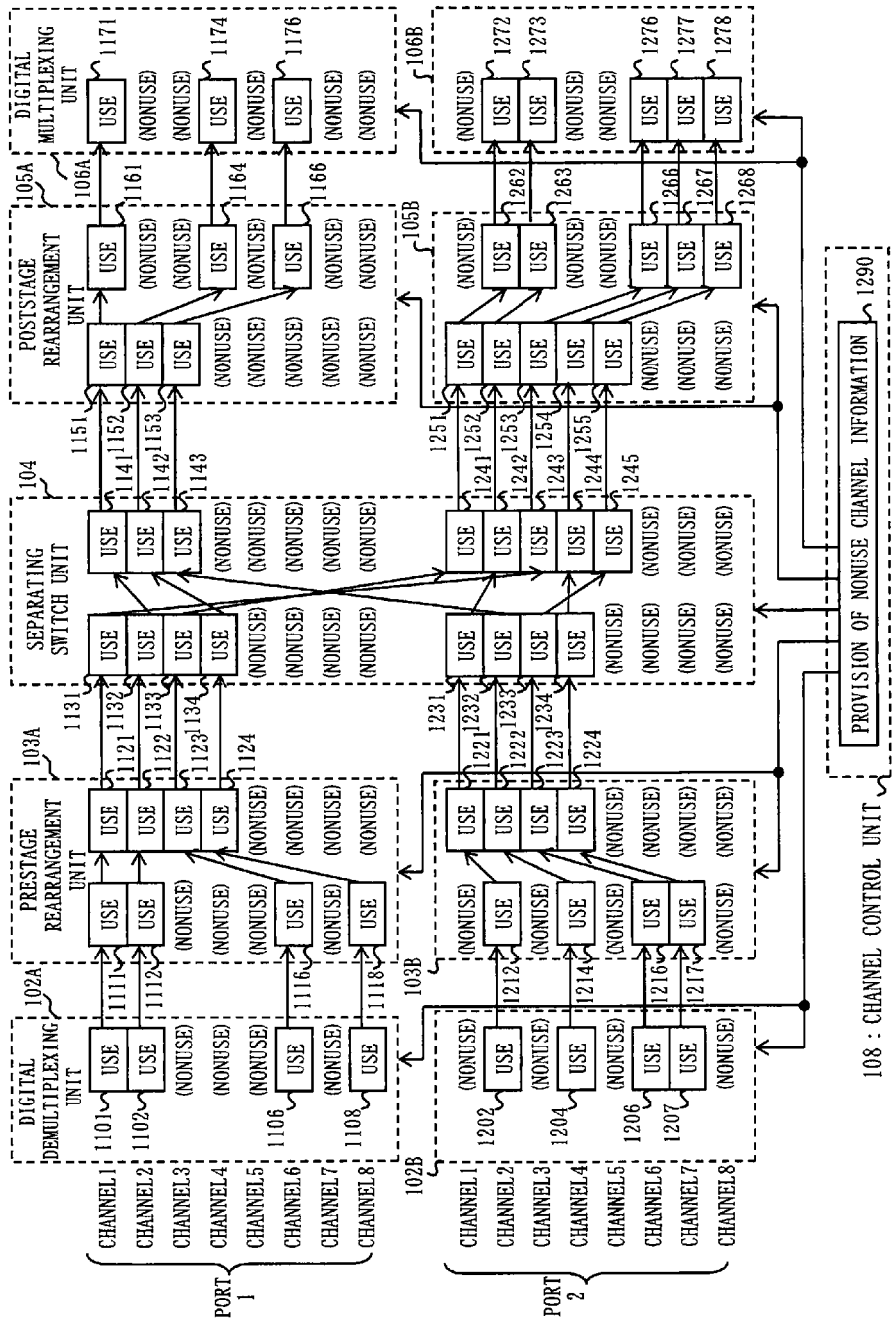
FIG. 13 is a diagram for explaining a channel control method of the wireless communication apparatus 100 according to the first embodiment.

FIG. 13 is a diagram for explaining a channel control method of the wireless communication apparatus 100 according to this embodiment.

The channel control method to be carried out by the channel control unit 108 will be described, using FIG. 13.

The channel control method to be carried out by the channel control unit 108 includes a control method of changing passage routes of one or more of the channel signals in the wireless communication apparatus 100 and a method of notifying to each component one or more of the channels set to be unused.

A description will be given about an example of a method of reducing power consumption by the respective components based on control information received by the respective components from the channel control unit 108, using FIG. 13.

As illustrated in FIG. 13, the wireless communication apparatus 100 has two input ports and two output ports. The number of the channels of one input port is eight, and the number of the channels of one output port is eight. FIG. 13 illustrates disposition of the channels set to be used and the channels set to be unused for each component in the wireless communication apparatus 100 and channel signal flows within the wireless communication apparatus 100.

FIG. 13 illustrates the case using the two ports and the eight channels, for simplification of the description. The number of the channels and the number of the ports are not limited to these numbers. It is assumed that the circuit of the separating switch unit 104 is divided by a method of respectively accommodating switching processing circuits in the devices 703A to 703H for each same channel number for the respective ports, as illustrated in FIG. 9. It is to be noted that FIG. 13 is a logical diagram for explanation and is different from the physical configuration illustrated in FIG. 9.

As illustrated in FIG. 13, the channel 1, the channel 2, the channel 6, and the channel 8 are used as the input channels of the input port 1. The channel 2, the channel 4, the channel 6, and the channel 7 are used as the input channels of the input port 2.

It is assumed that the channel control unit 108 receives, from the channel switching information of the channel information, an instruction to perform switching between the input channels of the input ports and the output channels of the output ports as follows:

input port 1/input channel 1→output port 2/output channel 6 input port 1/input channel 2→output port 1/output channel 1 input port 1/input channel 6→output port 2/output channel 2 input port 1/input channel 8→output port 1/output channel 4 input port 2/input channel 2→output port 2/output channel 3 input port 2/input channel 4→output port 1/output channel 6 input port 2/input channel 6→output port 2/output channel 8 input port 2/input channel 7→output port 2/output channel 7

When channel control for power consumption reduction is not executed in the wireless communication apparatus 100, the above-mentioned channel switching information is stored in the switching table 704.

However, when the channel control for power consumption reduction is executed in the wireless communication apparatus 100 according to this embodiment, optimization is performed for the switching table 704.

However, even if the optimization has been performed for the switching table 704, control is executed so that switching between the input channels of the input ports and the output channels of the output ports is the same as the switching described in the channel switching information.

The channel control unit 108 transmits to the digital demultiplexing unit 102 nonuse channel information (nonuse input channel information for the input ports) before the switching. The channel control unit 108 transmits to the digital multiplexing unit 106 nonuse channel information (nonuse output channel information for the output ports) after the switching.

Reference numerals 1101, 1102, 1106 and 1108 indicate an example of the channels of the input port 1 set to be used in the digital demultiplexing unit 102A. The digital demultiplexing unit 102A associated with the input port 1 stops a clock of the filter bank that performs demultiplexing, for each of the channels 3, 4, 5, and 7 that are the input channels set to be unused.

Reference numerals 1202, 1204, 1206, and 1207 indicate an example of the channels of the input port 2 set to be used in the digital demultiplexing unit 102B.

The digital demultiplexing unit 102B associated with the input port 2 stops a clock of the filter bank that performs demultiplexing, for each of the channels 1, 3, 5, and 8 that are the input channels set to be unused.

Reference numerals 1171, 1174, and 1176 indicate an example of the channels of the output port 1 set to be used in the digital multiplexing unit 106A. Reference numerals 1272, 1273, 1276, 1277, and 1278 indicate an example of the channels of the output port 2 set to be used in the digital multiplexing unit 106B.

Like the digital demultiplexing unit 102, the digital multiplexing unit 106A for the output port 1 stops a clock of a filter bank that performs multiplexing, for each of the channels 2, 3, 5, 7, and 8 that are the output channels set to be unused. The digital multiplexing unit 106B for the output port 2 stops a clock of the filter bank that performs multiplexing, for each the channels 1, 4, and 5 that are the output channels set to be unused.

As mentioned above, the separating switch unit 104 is divided into the devices for respective circuits each of which performs switching processes for the same channel number for respective ports.

Consequently, more processes may be performed within the same device using the same channel number for the respective ports than in a device where the channels to be used for the respective ports are dispersed, and the number of the devices that do not perform the processes may be increased.

Accordingly, by turning off one or more of the devices that do not perform the processes, more power consumption may be reduced.

The channel control unit 108 performs channel rearrangements for each input port and for each output port of the prestage rearrangement unit 103 and the poststage rearrangement unit 105 such that the number of the devices set to be unused in the separating switch unit 104 becomes the largest. Then, the channel control unit 108 alters the switching table 704 in the separating switch unit 104 such that according to the channel rearrangements for each input port and for each output port, an input-output state based on the channel switching information may be finally obtained.

Specifically, the channel control unit 108 executes the following control over the prestage rearrangement units 103A and 103B for the respective input ports 1 and 2.

The channel control unit 108 rearranges the numbers of the channels set to be used and unused in each port so that the numbers of the channels set to be used are sequentially arranged in an ascending order.

In other words, the channel control unit 108 controls the prestage rearrangement unit 103 for each port to perform the rearrangement so that, when one of the channel numbers for the channels set to be used in each port is small and is not used, the position of the small channel number is replaced by the channel having the channel number larger than the small channel number and set to be used to perform signal output.

The channel control unit 108 executes the above-mentioned control by outputting to the prestage rearrangement unit 103 the nonuse channel information before and after the rearrangement.

Reference numerals 1111, 1112, 1116, and 1118 indicate an example of the channels set to be used before the rearrangement by the prestage rearrangement unit 103A for the input port 1. Reference numerals 1212, 1214, 1216, and 1217 indicate an example of the channels set to be used before the rearrangement by the prestage rearrangement unit 103B for the input port 2.

Reference numerals 1121 to 1124 indicate an example of the channels set to be used after the rearrangement by the prestage rearrangement unit 103A for the input port 1. Reference numerals 1221 to 1224 indicate an example of the channels set to be used after the rearrangement by the prestage rearrangement unit 103B for the input port 2.

In the prestage rearrangement unit 103A for the input port 1, the channels set to be used are the channel 1, the channel 2, the channel 6, and the channel 8. The channel control unit 108 instructs the prestage rearrangement unit 103A to perform signal output by replacing, among these channels set to be used, the channel 6 and the channel 8 by the channel 3 and the channel 4, respectively.

In the prestage rearrangement unit 103B for the input port 2, the channels set to be used are the channel 2, the channel 4, the channel 6, and the channel 7. The channel control unit 108 instructs the prestage rearrangement unit 103B to perform signal output by replacing, among these channels set to be used, the channel 2, and the channel 4, the channel 6, and the channel 7 by the channel 1, the channel 2, the channel 3, and the channel 4, respectively.

By executing the control in this way, four channels with small channel numbers are all set to be used, as outputs from each of the input ports 1 and the input port 2 of the prestage rearrangement unit 103.

The clock stop instruction unit 504 (see FIG. 7) of the prestage rearrangement unit 103 stops a clock to the circuit that performs an input process of the prestage rearrangement unit 103, based on information on each channel set to be unused before the rearrangement. The clock stop instruction unit 504 stops a clock to the circuit that performs an output process of the prestage rearrangement unit 103, based on information on each channel set to be unused after the rearrangement.

In circuits that perform input processes of the separating switch unit 104, four channels with the small channel numbers are used as the input channels of the port 1 and four channels with the small channel numbers are used as the input channels of the port 2, based on the rearrangement of the channels performed by the prestage rearrangement unit 103.

The separating switch unit 104 performs one or more of the switching operations across the ports. The channel control unit 108 alters the switching table setting information so that, when the switching operations are performed, output is performed to the channels with small output channel numbers, and transmits the switching table setting information that has been altered to the separating switch unit 104.

In the example in FIG. 13, the channel control unit 108 transmits an instruction to alter the content of the switching table 704 to the separating switch unit 104 so that switching between the input channels of the input ports and the output channels of the output ports is performed as follows:

input port 1/input channel 1→output port 2/output channel 3 input port 1/input channel 2→output port 1/output channel 1 input port 1/input channel 3→output port 2/output channel 1 input port 1/input channel 4→output port 1/output channel 2 input port 2/input channel 1→output port 2/output channel 2 input port 2/input channel 2→output port 1/output channel 3 input port 2/input channel 3→output port 2/output channel 5 input port 2/input channel 4→output port 2/output channel 4

By executing control as mentioned above by the channel control unit 108, three channels with the small channel numbers are set to be used as the output channels of the port 1 of the separating switch unit 104, and five channels with the channel numbers that are small are set to be used as the output channels of the port 2 of the separating switch unit 104.

Reference numerals 1131 to 1134 indicate an example of the channels of the input port 1 of the separating switch unit 104 set to be used before the switching. Reference numerals 1231 to 1234 indicate an example of the channels of the input port 2 of the separating switch unit 104 set to be used before the switching.

Reference numerals 1141 to 1143 indicate an example of the channels of the output port 1 of the separating switch unit 104 set to be used after the switching.

Reference numerals 1241 to 1245 indicate an example of the channels of the output port 2 of the separating switch unit 104 set to be used after the switching.

The separating switch unit 104 is divided into the devices for the respective circuits each having the same channel number for the respective ports. In the example in FIG. 13, the channels 1131, 1141, 1231, and 1241 are accommodated in one device, the channels 1132, 1142, 1232, and 1242 are accommodated in another device, and the same applies hereinafter, for accommodation. In this case, power supply is stopped to the devices of the separating switch which perform the processes for the channels 6, 7, and 8, where the input channels and the output channels of all the ports are set to be unused.

Further, in the device in the separating switch which performs the processes for the channel 4, clock supply is stopped to the circuit that performs the process for the output channel of the port 1 set to be unused. Similarly, in the device of the separating switch which performs the processes for the channel 5, clock supply is stopped to the circuit that performs the input process and an output process for the port 1 set to be unused and the circuit that performs the input process for the port 2. By stopping power supply to the devices and clock supply to the circuits set to be unused in this way, power consumption may be reduced.

The division method and the power consumption reduction method of the separating switch unit 104 are not limited to this example. When the separating switch unit 104 can be all implemented in one device, for example, power consumption may also be reduced by a method of stopping clocks to all the processing circuits for the input and output channels of the ports 1 and 2 set to be unused.

The channel control unit 108 instructs each of the poststage rearrangement units 105A and 105B for the respective ports to rearrange the signal to be output from the channel of the number on the output side of each port, from which the signal is to be output.

The output channel of the number in each port, from which the signal is to be output, is given from information input from the channel control unit 108 as the channel switching information. The information on the output side in the channel switching information indicates the channel of the number on the output side of each port, from which the signal is to be output.

Reference numerals 1151 to 1153 indicate an example of the channels of the poststage rearrangement unit 105A for the output port 1 set to be used before the rearrangement. Reference numerals 1251 to 1255 indicate an example of the channels of the poststage rearrangement unit 105B for the output port 2 set to be used before the rearrangement.

Reference numerals 1161, 1164, and 1166 indicate an example of the channels of the poststage rearrangement unit 105A for the output port 1 set to be used after the rearrangement. Reference numerals 1262, 1263, 1266, 1267, and 1268 indicate an example of the channels of the poststage rearrangement unit 105B for the output port 2 set to be used after the rearrangement.

In the example in FIG. 13, the channel control unit 108 instructs the poststage rearrangement unit 105A to perform signal output from the port 1 by replacing the channel 2 by the channel 4 and replacing the channel 3 by the channel 6. The channel control unit 108 instructs the poststage rearrangement unit 105B to perform signal output from the port 2 by replacing the channel 1 by the channel 2, replacing the channel 2 by the channel 3, replacing the channel 3 by the channel 6, replacing the channel 4 by the channel 7, and replacing the channel 5 by the channel 8.

In this case, the clock stop instruction unit 504 (see FIG. 7) of the poststage rearrangement unit 105 executes clock stop to one or more of the circuits that perform input processes of the poststage rearrangement unit 105, based on information on one or more of the channels set to be unused before the rearrangement. The clock stop instruction unit 504 executes clock stop to one or more of the circuits that perform output processes of the poststage rearrangement unit 105, based on information on one or more of the channels set to be unused after the rearrangement.

Specifically, the clock stop instruction unit 504 of the poststage rearrangement unit 105 stops a clock to each of the circuits that perform the input processes of the channels 4, 5, 6, 7, and 8 set to be unused before the rearrangement.

The clock stop instruction unit 504 stops a clock to each of the circuits that perform the output processes of the channels of the numbers set to be unused after the rearrangement.

In the method of dividing the separating switch unit 104 into the devices in FIG. 13, one device is assigned for each channel with the same channel number for the respective ports. In the device selection method of the separating switch unit 104, device selection is sequentially made in an ascending order of the channel numbers. The device division method and the device selection (channel selection) method, however, are not limited to this example.

Figure 14:
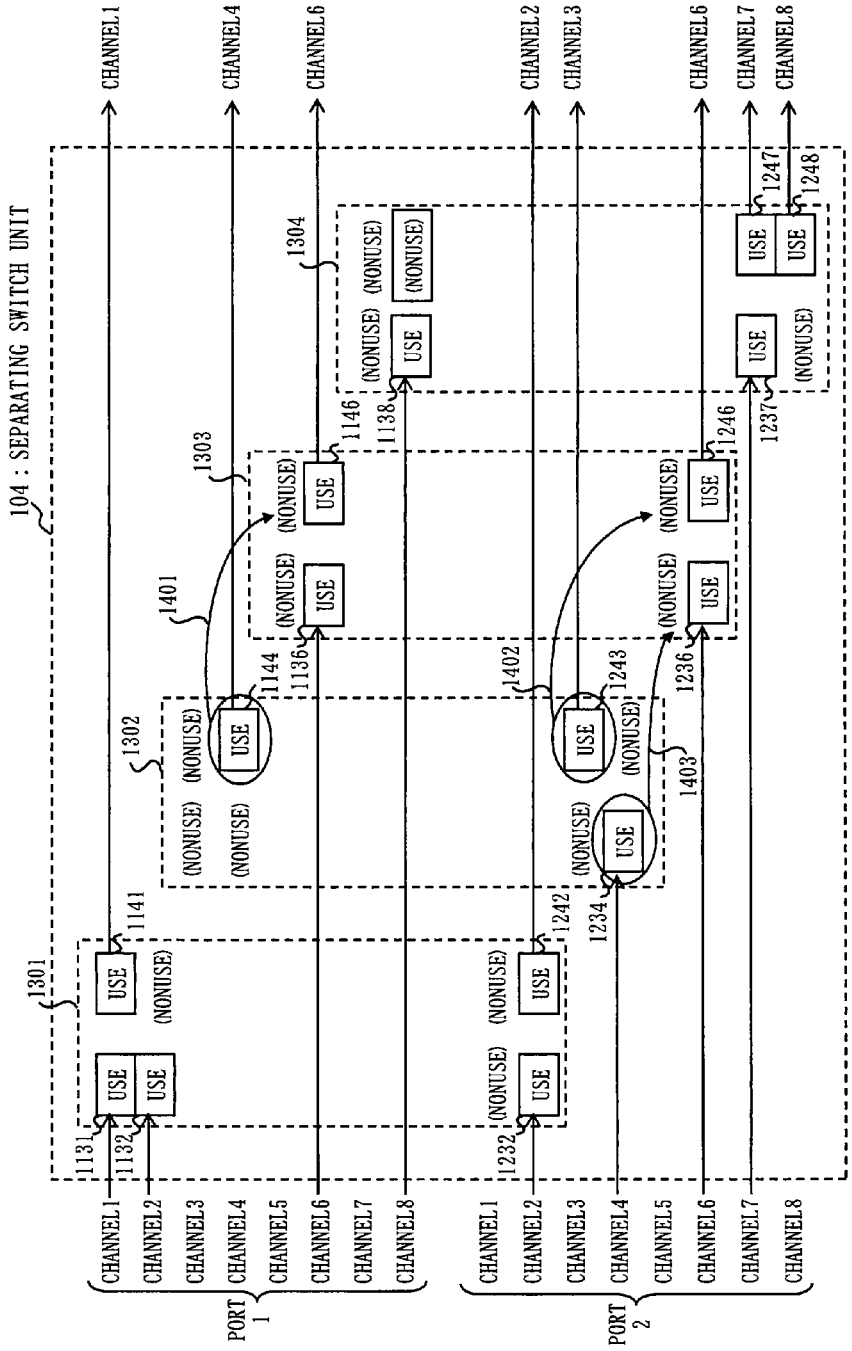
FIG. 14 is a diagram for explaining a different configuration example of the separating switch 104 and a different channel control method of the wireless communication apparatus 100 according to the first embodiment.

FIG. 14 illustrates a device division method of assigning one device for every two channels each having the same channel number for the respective ports of the separating switch unit 104. FIG. 14 is a diagram for logically explaining a device selection method of the separating switch unit 104 in which device selection is made so that the number of the devices set to be used is minimized and degrees of switching of the prestage rearrangement unit 103 and the poststage rearrangement unit 105 and a degree of alteration of the switching table 704 of the separating switch unit 104 are minimized.

Referring to FIG. 14, the separating switch unit 104 includes separating switch devices (hereinafter referred to as devices 1301, 1302, 1303, and 1304). Switching processes for the channels 1 and 2 of each port are performed at the device 1301. Switching processes for the channels 3 and 4 of each port are performed at the device 1302. The same applies hereinafter, and switching processes for the channels 5 and 6 are performed at the device 1303. Switching processes for the channels 7 and 8 are performed at the device 1304.

The example in FIG. 14 illustrates a state of the prestage rearrangement unit 103 and the poststage rearrangement unit 105 before rearrangement. FIG. 14 illustrates the example where signals are input from the channels 1, 2, 6, and 8 of the port 1 and the channels 2, 4, 6, and 7 of the port 2 as inputs, and the signals are output from the channels 1, 4, and 6 of the port 1 and the channels 2, 3, 6, 7, and 8 of the port 2. Illustration of switch operations inside the separating switch unit 104 is omitted.

The following gives a method of changing the channels of the devices to be used, from the state in FIG. 14, such that the number of the devices to be used is minimized.

The port having the largest number of the output channels is the port 2 having five channels. The switching processes for two channels are performed at each device. Thus, three devices at a minimum are used. Since four devices are used in the example of FIG. 14, the switching processes at one device are transferred to a different one of the devices. In this case, the switching processes at the device 1302 having the smallest number of circuits set to be used by input and output units are transferred to the different device in order to minimize a modification amount of channel setting. The switching processes are transferred to the device 1303 having the next smallest number of circuits set to be used after the device 1302, as illustrated by arrows 1401, 1402, and 1403, in order to equalize heat generation amounts of the devices.

Transfer control of these processes is executed by the channel control unit 108. In order to execute the above-mentioned processes, the channel control unit 108 issues to the prestage rearrangement unit 103B an instruction to rearrange the channel 4 of the port 2 to the channel 5 of the port 2. The channel control unit 108 issues to the poststage rearrangement unit 105A an instruction to rearrange the channel 5 of the port 1 to the channel 4 of the port 1 and to rearrange the channel 5 of the port 2 to the channel 3 of the port 2. The channel control unit 108 updates switching information (setting information) of the input channel 4 of the port 2, the output channel 4 of the port 1, and the output channel 3 of the port 2 in the switching table 704 (routing table) of the separating switch unit 104 so that same final output channels are obtained according to the contents of the instructions for the switchings output to the prestage rearrangement unit 103 and the poststage rearrangement unit 105.

As described above, the wireless communication apparatus 100 according to this embodiment includes the A/D conversion unit that converts an analog signal with signals of the respective channels are multiplexed thereon by the frequency division multiplexing method into a digital signal and the digital demultiplexing unit that separates the multiplexed channel signals from the converted digital signal. The wireless communication apparatus 100 further includes the prestage channel rearrangement unit that performs channel signal rearrangement in the input ports, the channel switch unit that performs switching processes for one or more of the channels across the ports, the poststage channel rearrangement unit that performs channel signal rearrangement in the output ports, and the digital multiplexing unit that performs multiplexing processes for the signals of the respective channels in the ports. Then, the wireless communication apparatus 100 further includes the D/A conversion unit that converts the digital signal with the signals multiplexed thereon to an analog signal and the channel control unit that controls the channels of the digital demultiplexing unit, the prestage channel rearrangement unit, the channel switch unit, the poststage channel rearrangement unit, and the digital multiplexing unit. The channel switch unit is constituted from a switching processing unit with a configuration where a block that performs switching processes may be separated for each channel with the same number.

The digital demultiplexing unit in the wireless communication apparatus 100 according to this embodiment is constituted from the filter bank having a configuration in which a block that performs the process for each channel may be separated. The digital multiplexing unit is constituted from a filter bank having a configuration in which the block that performs the process for each channel may be separated.

The channel control unit in the wireless communication apparatus 100 according to this embodiment executes control for reducing power consumption of the processing circuits for each channel in the prestage channel rearrangement unit set to be unused before and after rearrangement.

Further, the channel control unit executes channel rearrangement control so that one or more of positions of the channels disposed dispersively are rearranged by the prestage channel rearrangement unit to reduce power consumption of the poststage channel switch unit. The channel control unit executes control to reduce power consumption of the processing circuits for each of the channels in the channel switch unit set to be unused before and after switching. The channel control unit further executes control of updating the switching table according to one or more of the channels to be rearranged by the prestage channel rearrangement unit and the poststage channel rearrangement unit.

The channel control unit executes control for reducing power consumption of the processing circuits for one or more of the channels in the poststage channel rearrangement unit set to be unused before and after rearrangement. Further, the channel control unit executes channel rearrangement control so that the channels output by the channel switch unit are output as the channels that are proper in the ports in the poststage channel rearrangement unit.

The channel control unit executes control for reducing power consumption of the processing circuit for each channel set to be unused in the digital demultiplexing unit and also executes control for reducing power consumption of the processing circuit for each channel set to be unused in the digital multiplexing unit.

As described above, the wireless communication apparatus 100 according to this embodiment is so configured that the processing circuits of the digital demultiplexing unit, the channel switch unit, and the digital multiplexing unit may be divided for each channel. Further, the prestage rearrangement unit and the poststage rearrangement unit that perform rearrangement for each port are provided before and after the channel switch unit. Further, signal flow control is executed by the channel control unit so that power consumption is minimized.

Consequently, a communication system using the wireless communication apparatus 100 has an effect capable of reducing power consumption of the wireless communication apparatus 100 while allowing flexible operation whereby, when disposing frequency division multiplexed signals that will become input/outputs, the channel signals may be disposed at arbitrary frequency positions.

Second Embodiment

In this embodiment, a description will mainly be directed to a difference from the first embodiment.

By assigning same reference signs to functions and structures that are the same those of the wireless communication apparatus 100 described in the first embodiment, descriptions of the functions and the structures may be omitted.

Assume that the wireless communication apparatus 100 is used in a situation of being mounted on an artificial satellite or the like, where repair of the wireless communication apparatus 100 is difficult, for example. Then, the wireless communication apparatus 100 is requested to have a longer service life. In response to the request for the longer service life, a method of obtaining failure resistance such as selection of a device that is fault tolerant, a device test, or a redundant device configuration is carried out for each component in the wireless communication apparatus 100.

In this embodiment, a description will be given about a method of further controlling each device to be used in the wireless communication apparatus 100, thereby achieving a further longer service life.

It is known that, in the case of a device mounted on an artificial satellite, due to degradation caused by exposure to radiation or the like or by giving an electrical stress to make the device to be electrically conductive and kept in a high temperature state, the device is degraded to reduce its service life. When attention is focused on the degradation by giving the electrical stress, this degradation becomes manifest especially in the device that has a large circuit size and therefore has a larger heat generation amount.

In view of this aspect, when the wireless communication apparatus 100 has the configuration described in the first embodiment, the separating switch unit 104 may be pointed out as one of elements that will increase the size of the configuration. Similarly, the digital demultiplexing unit 102 and the digital multiplexing unit 106 may be pointed out as the elements that will increase the circuit size. However, when a failure occurs in the digital demultiplexing unit 102 or the digital multiplexing unit 106, only a user associated with signals of the input ports of the digital demultiplexing unit 102 or the digital multiplexing unit 106 is affected. On contrast therewith, when a failure occurs in the separating switch unit 104, all users associated with the apparatus may be affected. Thus, influence to be caused by the failure in the separating switch unit 104 is more serious.

In this embodiment, a description will be given about a method of extending service life of each device by executing device control of the channel control unit 108 in the wireless communication apparatus 100 disclosed in the first embodiment. In the device control, each device is periodically released from an electrical stress.

Specifically, the channel control unit 108 periodically changes the device not to be used in the separating switch unit 104, for the channel set to be unused. With this arrangement, the electrical stress to be applied to a specific one of the devices in the separating switch unit 104 may be distributed to a different one of the devices. The service life of each device may be thereby extended.

There is also a method of switching a specific one of the devices in the separating switch unit 104, in which a failure has been detected, to a different one of the devices corresponding to the channel number of the channel set to be unused. In this case, however, all the users associated with all the ports may be affected by a service stop when the failure has occurred.

Accordingly, it is desirable to use the method of avoiding the service stop not intended by the users as much as possible while executing the device control so as to extend the service life of each device, in the wireless communication apparatus 100.

The following description will be given about the method of executing control of changing one or more of the devices to be used in the separating switch unit 104 by the channel control unit 108.

It is assumed that the wireless communication apparatus 100 has a configuration that is the same as the configuration of the wireless communication apparatus 100 described in the first embodiment, and that the state of each channel is the same as the state described in the first embodiment and illustrated in FIG. 13.

It is assumed that a device division method in the separating switch unit 104 is the same as the method described with reference to FIG. 9 in the first embodiment. That is, the description will be made, assuming that the separating switch unit 104 is divided into the devices for each same channel number for the respective ports.

In the first embodiment, according to a specific algorithm, the separating switch unit 104 executes control of concentrating inputs/outputs on the channels with small channel numbers based on an instruction of the channel control unit 108, for example. However, when such control is executed, a probability that a specific one of the channels is selected may increase. In the example of the algorithm of selecting the channels with the small channel numbers as mentioned above, a probability that the channels with the small channel numbers are selected as the channels for use is high. Thus, each of the channels having the small channel numbers may be brought into a state where an electrical stress is constantly given.

For this reason, the channel control unit 108 executes control such that the number for channel selection is periodically changed or randomly selected.

In the example of the algorithm of selecting the channels having the small channel numbers as mentioned above, the channel control unit 108 first executes channel rearrangement control such that, with respect to the channel numbers on the input side of the separating switch unit 104, the channels 1, 2, 3, and 4 are set to the channels to be used.

After operating the separating switch unit 104 for a certain period of time in this state, the channel control unit 108 next changes the channel rearrangement control such that, with respect to the channel numbers on the input side of the separating switch unit 104, the channel 1 is set to the channel not to be used and the channels 2, 3, 4, and 5 are set to the channels to be used.

The channel control unit 108 changes rearrangement control for the channel numbers on the output side after the switching as well, by the same method as that for the channel numbers on the input side.

As a method of switching the channel number in this case, there is a method of switching a signal with the smallest channel number of the channels to be used to the channel number subsequent to the largest channel number of the channels to be used. Alternatively, as the method of switching the channel number, there is a method of shifting each channel number of all the channels to be used to the channel number that is incremented by one. This embodiment indicates an example where the separating switch unit is divided into the devices each for accommodating one channel. When a plurality of the channels are accommodated in one device, however, channel rearrangement is performed so that the devices which are different to each other are respectively selected for the channel to be switched according to the former method and the channel to be shifted according to the latter method.

A description will be given about a specific operation, taking a case where the former method is used, as an example.

First, the channel control unit 108 instructs the prestage rearrangement unit 103 to rearrange one or more of the channels, as described in FIG. 8 in the first embodiment. The channel control unit 108 transmits to the separating switch unit 104 switching table setting information that has been altered according to the channel rearrangement, as described in the first embodiment. Switching information that has been updated corresponding to the channel rearrangement described in the first embodiment is set in the switching table 704 of the separating switch unit 104.

The wireless communication apparatus 100 operates in the above-mentioned state for the certain period of time.

Figure 15:
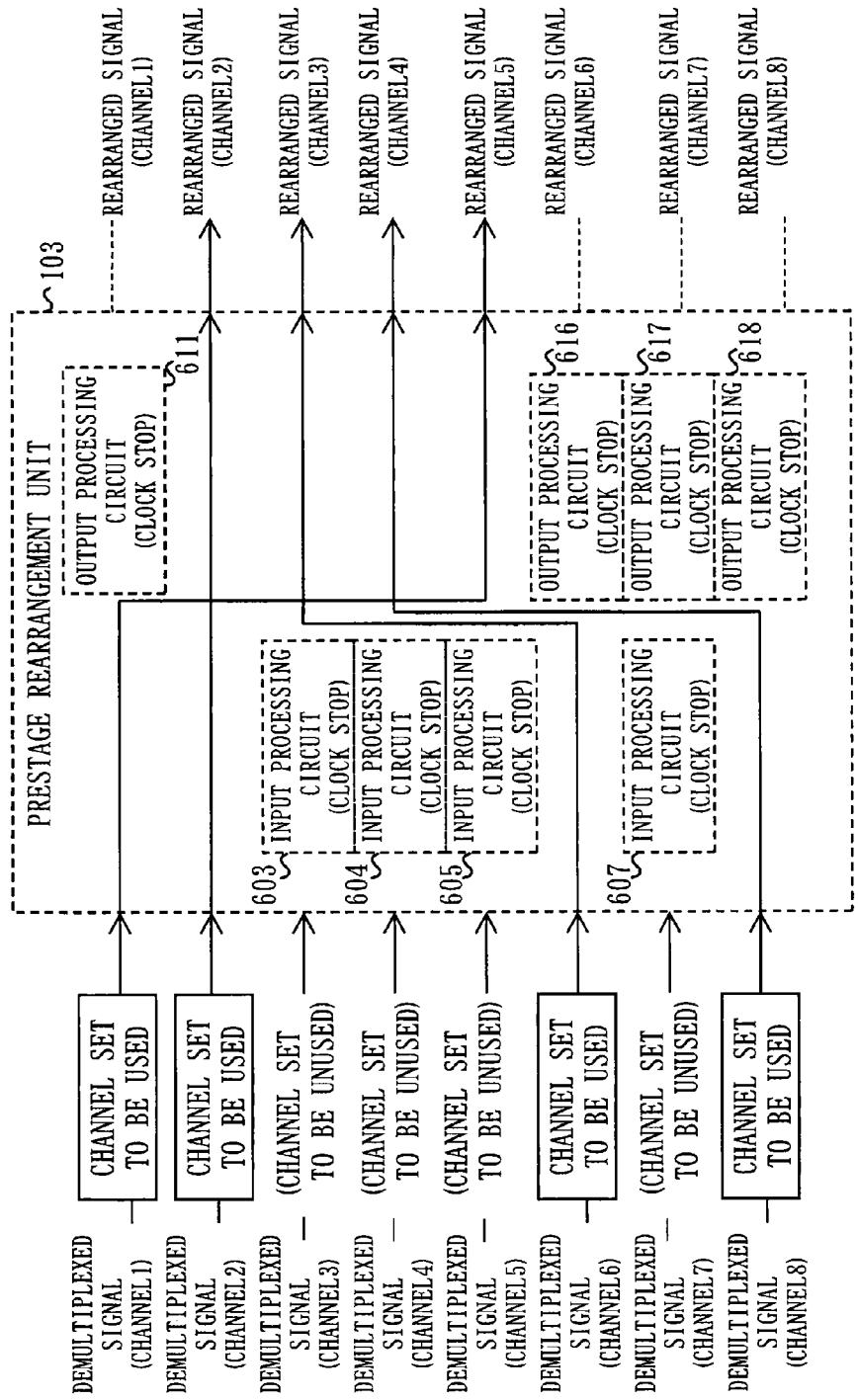
FIG. 15 is a diagram for explaining an operation example of the prestage rearrangement unit 103 of the wireless communication apparatus 100 according to a second embodiment.

FIG. 15 is a diagram for explaining an operation example of the prestage rearrangement unit 103 in the wireless communication apparatus 100 according to this embodiment.

After lapse of the certain period of time in the above-mentioned state, the channel control unit 108 gives an instruction to change channel rearrangement to the prestage rearrangement unit 103, as illustrated in FIG. 15. Specifically, the channel control unit 108 transmits an instruction to perform rearrangement such that an input signal of the channel 1 is output to the channel 5.

Nonuse channel information after the rearrangement in this case includes information indicating that the channel 1 is the channel set to be unused and the channel 5 is the channel set to be used. The channel control unit 108 outputs to the prestage rearrangement unit 103 the unnuse channel information after the rearrangement including the information indicating that the channel 1 is the channel set to be unused and the information indicating that the channel 5 is the channel set to be used.

The channel control unit 108 transmits to the separating switch unit 104 switching table setting information (information for the switch unit) to be set in the switching table of the separating switch unit 104.

First, a description will be given about a change in the information at the input side (before the switching) of the switching table setting information.

The channel control unit 108 transfers the information on the channel 1 of the port 1 at the input side (before the switching) of the switching table setting information to the information of the channel 5 in the port 1. That is, the channel control unit 108 transfers the information of "use" of the channel 1 of the port 1 at the input side (before the switching) of the switching table setting information to the information of the channel 5 of the port 1. Thus, the information of the channel 5 of the port 1 at the input side (before the switching) is changed to "use" and the information of the channel 1 of the port 1 is changed to "nonuse".

The channel control unit 108 transfers the information of the channel 1 of the port 2 at the input side (before the switching) of the switching table setting information to the information of the channel 5 of the port 2. That is, the channel control unit 108 transfers the information of "use" of the channel 1 of the port 2 at the input side (before the switching) of the switching table setting information to the information of the channel 5 of the port 2. Thus, the information of the channel 5 of the port 2 at the input side (before the switching) is changed to "use" and the information of the channel 1 of the port 2 is changed to "nonuse".

Next, a description will be given about a change in the information at the output side (after the switching) of the switching table setting information.

The channel control unit 108 transfers the information of the channel 1 of the port 1 at the output side (after the switching) of the switching table setting information to the information of the channel 4 of the port 1. That is, the channel control unit 108 transfers the information of "use" of the channel 1 of the port 1 at the output side (after the switching) of the switching table setting information to the information of the channel 4 of the port 1. Thus, the information of the channel 4 of the port 1 at the output side (after the switching) is changed to "use" and the information of the channel 1 of the port 1 is changed to "nonuse".

The channel control unit 108 transfers the information of the channel 1 of the port 2 at the output side (after the switching) of the switching table setting information to the information of the channel 6 of the port 2. That is, the channel control unit 108 transfers the information of "use" of the channel 1 of the port 2 at the output side (after the switching) of the switching table setting information to the information of the channel 6 of the port 2. Thus, the information of the channel 6 of the port 2 at the output side (after the switching) is changed to "use" and the information of the channel 1 of the port 2 is changed to "nonuse".

The channel control unit 108 transmits nonuse channel information before rearrangement to the poststage rearrangement unit 105A. This nonuse channel information before the rearrangement includes information indicating that the channel 1 is the channel set to be unused and information indicating that the channel 4 is the channel set to be used.

The channel control unit 108 transmits nonuse channel information before the rearrangement to the poststage rearrangement unit 105B. This nonuse channel information before the rearrangement includes information indicating that the channel 1 is the channel set to be unused and information indicating that the channel 6 is the channel set to be used.

In this way, the channel control unit 108 causes the poststage rearrangement unit 105 as well to alter rearrangement information with respect to each channel whose transition has occurred so that the channel 1 is not to be used, by the control method similar to that for the prestage rearrangement unit 103.

Figure 16:
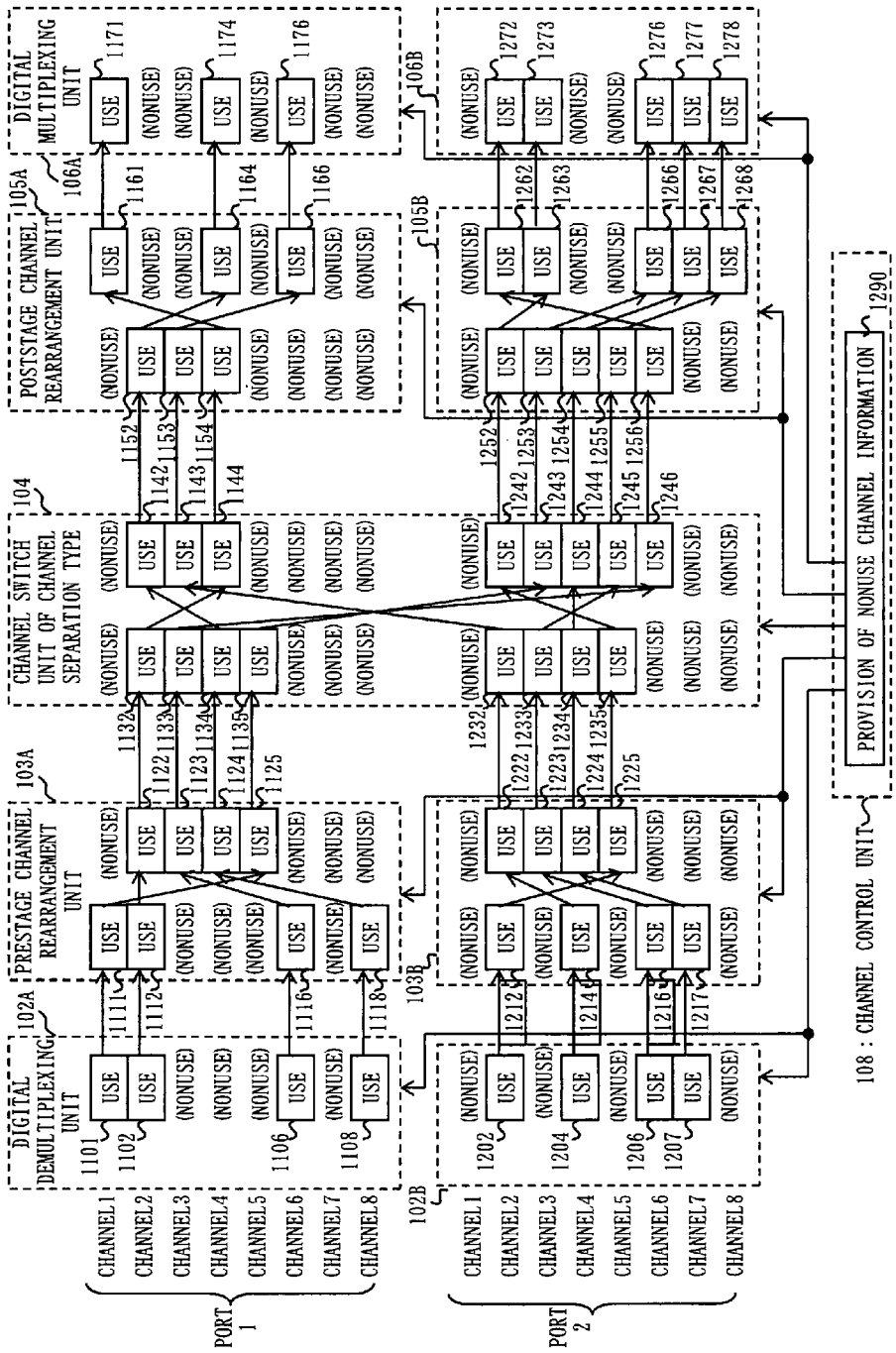
FIG. 16 is a diagram for explaining a channel control method of the wireless communication apparatus 100 according to the second embodiment.

FIG. 16 is a diagram for explaining a channel control method of the wireless communication apparatus 100 according to this embodiment.

Using FIG. 16, a description will be given about signal flows after the channel control unit 108 has changed the channel 1 to be unused.

FIG. 16 is a diagram illustrating the signal flows when control for causing the channels to transition by the channel control unit 108 has been started, after the certain period of time has passed in the state of the signal flows described with reference to FIG. 13.

As illustrated in FIG. 16, the channel control unit 108 changes the channel 1 to be unused at the channel position after rearrangement by the prestage rearrangement unit 103, the channel positions of the separating switch unit 104, and the channel position before rearrangement by the poststage rearrangement unit 105. The channel rearrangement operation of the prestage rearrangement unit 103 is as described with reference to FIG. 15. The separating switch unit 104 in this embodiment is accommodated in the devices for respective processing circuits each having the same channel number for the respective ports. Thus, by setting the channel 1 for each of the ports 1 and 2 to be unused, the device that performs the process for the channel 1 is turned off.

Channel deletion, channel addition, and a change in switching connections are necessary for the switching table in the separating switch unit 104 as well, due to this channel change.

In this example, the channel control unit 108 alters the content of the switching table 704 as follows:

(deletion) input port 1/input channel 1→output port 2/output channel 3

(change) input port 1/input channel 2→output port 1/output channel 4

(change) input port 1/input channel 3→output port 2/output channel 6 input port 1/input channel 4→output port 1/output channel 2

(addition) input port 1/input channel 5→output port 2/output channel 3

(deletion) input port 2/input channel 1→output port 2/output channel 2 input port 2/input channel 2→output port 1/output channel 3 input port 2/input channel 3→output port 2/output channel 5 input port 2/input channel 4→output port 2/output channel 4

(addition) input port 2/input channel 5→output port 2/output channel 2

The poststage rearrangement unit 105 changes output destinations according to the contents of output channel changes in the switching table 704.

Control of the above-mentioned operations is executed by control of the channel control unit 108.

After channel control by the channel control unit 108 has been changed as mentioned above and then after the certain period of time has passed, the channel control unit 108 changes the channel control so that the input channel 2 is subsequently set to be unused.

Specifically, the channel control unit 108 executes control so that the channel 2 is changed to be unused at the channel position after rearrangement by the prestage rearrangement unit 103, the channel positions by the separating switch unit 104, and the channel position before rearrangement by the poststage rearrangement unit 105.

The prestage rearrangement unit 103 shifts the channel 2 after the rearrangement to the channel 6, sets the channel 2 to be the channel to be unused, and sets the channel 6 to be the channel to be used.

The channel control unit 108 executes control so that the channel 2 is set to be the channel to be unused and the device associated with the channel 2 is turned off in the separating switch unit 104 as well.

The same applies hereinafter. The channel control unit 108 transitions the channel for each lapse of the certain period of time, and repeats the control operation of turning off the device associated with the channel set to be unused. With respect to a channel switch timing after the lapse of the certain period of time, there is a method of managing time by the channel control unit 108 and performing channel switching according to the data end of a packet or the like that is input. Alternatively, there is a method of performing channel switching based on an instruction from a ground station when regular maintenance or the like is executed. Any one of the methods may be used.

As described above, the channel control unit in the wireless communication apparatus 100 according to this embodiment executes control for reducing power consumption of processing circuits for each channel set to be unused in the prestage channel rearrangement unit before and after rearrangement. The channel control unit further executes control so that a channel selection position is shifted for each certain period of time when control of channel rearrangement of positions of the channels disposed dispersively in the prestage channel rearrangement unit is executed so as to reduce power consumption of the poststage channel switch unit.

The channel control unit executes control for reducing power consumption of the processing circuits for one or more of the channels in the channel switch unit set to be unused before and after switching. The channel control unit further executes control for updating the switching table in the channel switch unit according to one or more of the channels to be rearranged by the prestage channel rearrangement unit and the poststage channel rearrangement unit. In this case, the channel control unit updates the switching table according to the control of shifting the channel selection position in each of the prestage channel rearrangement unit and the poststage channel rearrangement unit to be executed for each certain period of time.

The channel control unit executes control for reducing power consumption of processing circuits for one or more of the channels in the poststage channel rearrangement unit set to be unused before and after rearrangement. Further, the channel control unit executes channel rearrangement control so that the channels output by the channel switch unit are output as the channels that are proper in the ports in the poststage channel rearrangement unit. In this case, the channel control unit executes control of changing channel rearrangement according to a shift in the selection position of the channel to be performed for each certain period of time.

The channel switch unit is a component whose size and heat generation amount are large and will be largely affected by a failure, among the components of the wireless communication apparatus according to this embodiment.

Means for releasing an electrical stress from each device that implements the function of the channel switch unit for each certain period is provided at the wireless communication apparatus according to this embodiment. Consequently, the service life of the device in the channel switch unit may be extended. The service life of the wireless communication apparatus may also be thereby extended.

Third Embodiment

In this embodiment, a description will mainly be directed to a difference from the first and second embodiments.

By assigning same reference signs to functions and structures that are the same as those of the wireless communication apparatus 100 described in each of the first and second embodiments, descriptions of the functions and the structures may be omitted.

Assume that a wireless communication apparatus is used in a situation of being mounted on an artificial satellite or the like, where repair of the wireless communication apparatus is difficult. Then, the wireless communication apparatus may be affected by a failure in a satellite system or a failure in an apparatus mounted on the artificial satellite.

To take an example, power to be supplied to the wireless communication apparatus may be reduced due to a failure in the power supply system apparatus of a communication satellite system. Assume that a minimum necessary communication function can be provided even if power supply is reduced in this way. Then, a minimum necessary function of a communication satellite may be achieved. Thus, the service life of the communication satellite may be therefore extended.

The wireless communication apparatus may be requested to stop an existing service and perform communication using a channel with a highest priority due to high emergency as in the event of a failure. In this case, the wireless communication apparatus is not additionally requested to stop power supply to a channel with low priority. However, even in this case, it is advisable to reduce power consumption of the wireless communication apparatus by turning off a device associated with the channel with the low priority for which communication was no longer able to be performed due to the channel with priority or by stopping clock supply to processing circuits associated with the channel with the low priority.

Operation of the satellite system in such a way is referred to as a degraded operation. In this operation, communication is performed by prioritizing the high priority channel and by stopping power or clock supply to internal components that perform processes for communication using the low priority channel.

When the satellite system is operated using the degraded operation, a priority order of switching of the channels to be used is set in the wireless communication apparatus mounted on the artificial satellite in advance. Alternatively, the priority order of switching of the channels to be used is set in the wireless communication apparatus when the degraded operation is started.

When the degraded operation is instructed to the wireless communication apparatus, the wireless communication apparatus executes control such that channel input/output and switching are set starting from the channel with high priority among the channels that have been notified, in view of reduction of power consumption, and such that power consumption is reduced for processing circuits associated with each channel with low priority or set to be unused.

A description will be specifically given about a method of setting a priority channel when the degraded operation of the wireless communication apparatus 100 is performed.

Figure 17:
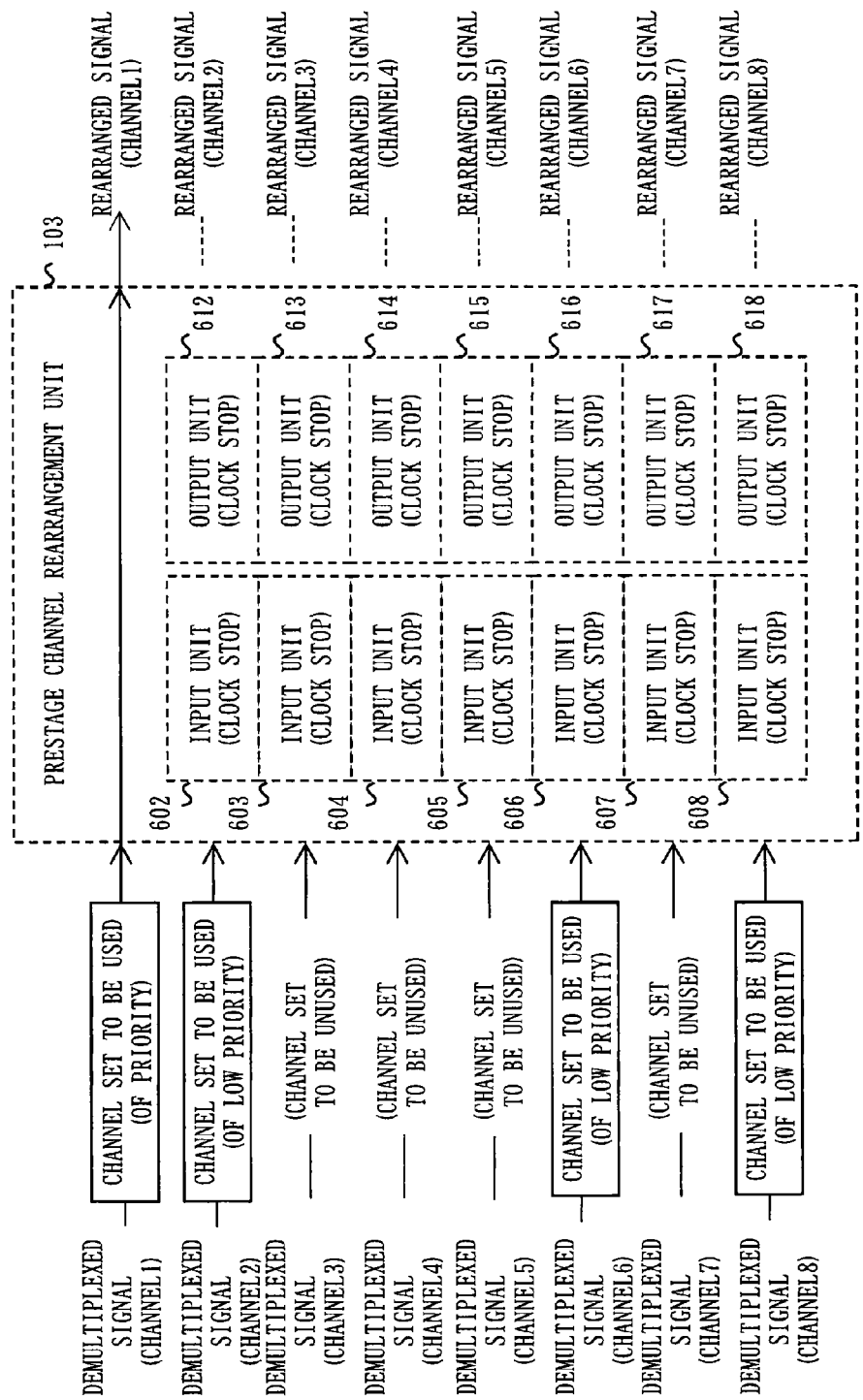
FIG. 17 is a diagram for explaining an operation example of the prestage rearrangement unit 103 of the wireless communication apparatus 100 according to a third embodiment.
Figure 18:
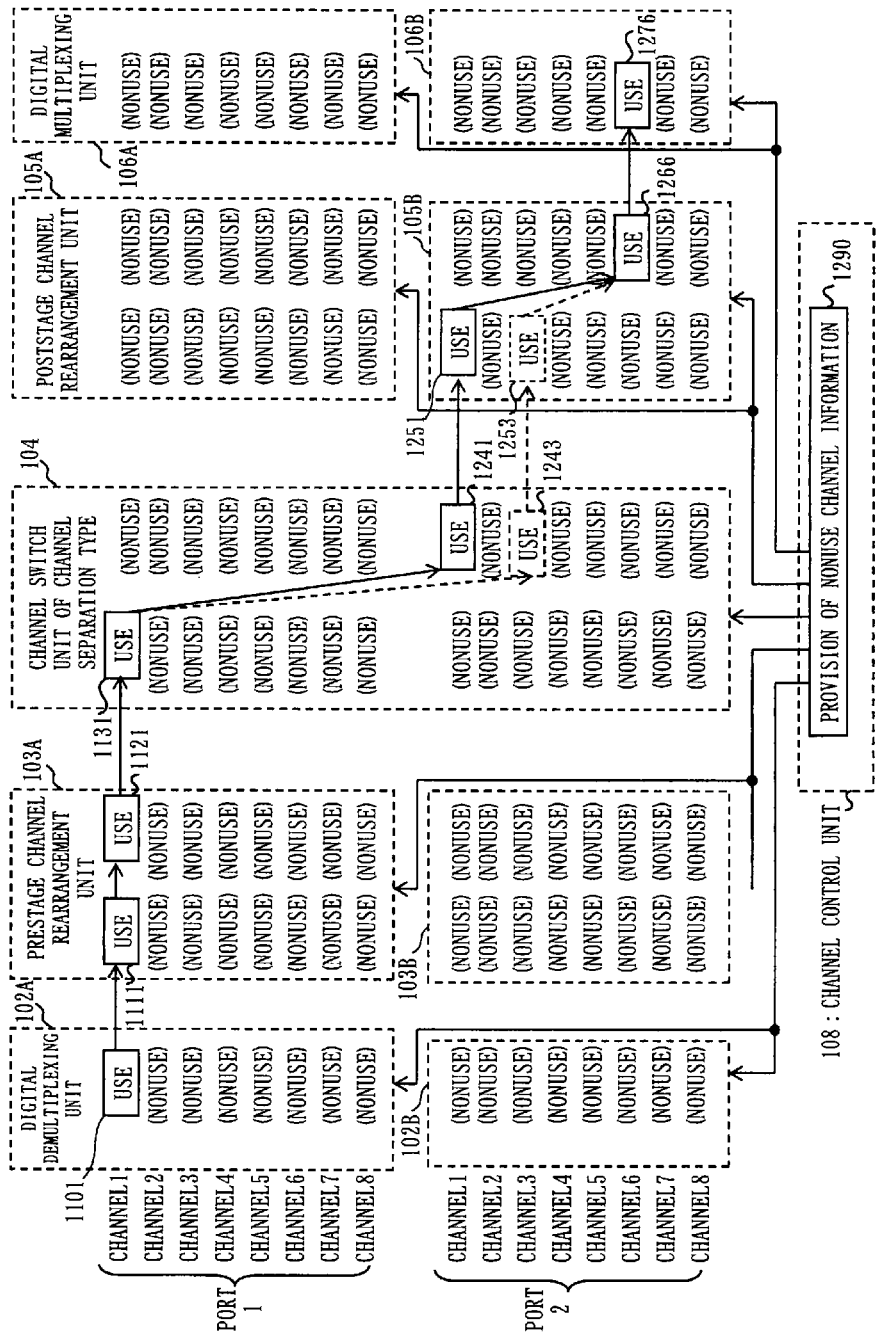
FIG. 18 is a diagram for explaining a channel control method of the wireless communication apparatus 100 according to the third embodiment.

FIG. 17 is a diagram for explaining an operation example of the prestage rearrangement unit 103 of the wireless communication apparatus 100 according to this embodiment. FIG. 18 is a diagram for explaining a channel control method of the wireless communication apparatus 100 according to this embodiment.

Using FIGS. 17 and 18, a description will be given about a case where a route from the input channel 1 of the input port 1 to the output channel 6 of the output port 2 is specified as a highest priority and the degraded operation is instructed to the wireless communication apparatus 100 described in the first embodiment during normal operation of the wireless communication apparatus 100 using the setting illustrated in FIG. 13.

FIG. 17 is a diagram that explains a change in operation of the prestage rearrangement unit 103 after the degraded operation has been started.

With respect to setting of priorities of the input channels, the channel 1 is set to a priority channel, and the channels 2, 6, and 8 are set to low priority channels.

When the degraded operation is started, the prestage rearrangement unit 103 rearranges only the channel 1 that is the priority channel, stops rearrangement of the low priority channels, and stops power supply or a clock to processing circuits associated with the low priority channels. The example in this case illustrates an example where the state of FIG. 6 illustrating the operation of the prestage rearrangement unit 103 before a start of the degraded operation is changed to FIG. 15 illustrating the operation of the prestage rearrangement unit 103 after the start of the degraded operation. Thus, only the route of the channel 1 is maintained, and operations of the other low priority channels are stopped.

FIG. 18 illustrates a change in channel setting and signal flow changes in the wireless communication apparatus after a start of the degraded operation from the case of the normal operation in FIG. 13 illustrating signal flows in the wireless communication apparatus before the degraded operation.

When the degraded operation is started, control for reducing power consumption is executed by turning off processing power sources for the other ports and the other channels except the route from the channel 1 of the input port 1 set as the priority channel to the output channel 6 of the output port 2 (through blocks and routes indicated by dotted lines in FIG. 18). Alternatively, the control for reducing power consumption is executed by executing clock stop.

As illustrated by the dotted lines in FIG. 18, usually, the input channel 1 of the input port 1 is switched to the output channel 3 of the output port 2. The separating switch unit 104 is divided into devices for respective processing circuits each having the same channel number for the respective ports. Thus, both of the devices for the channel 1 and the channel 3 will operate without alteration, thereby reducing the effect of power consumption reduction.

For this reason, the output channel for the input channel 1 of the input port 1 after switching is changed from the channel 3 to the channel 1 in the port 2. Setting of rearrangement by the poststage rearrangement unit 105 is also changed, together with this change. That is, the input channel 1 of the input port 1 passes through blocks and routes indicated by solid lines in FIG. 18. Control over these channels is executed by the channel control unit 108.

FIG. 18 illustrates a case where the priority channel is only one channel. When a plurality of the priority channels are set, the channel with next high priority is set by similar control, subsequently to setting of the above-mentioned priority channel.

As described above, in the wireless communication apparatus according to this embodiment, the priority channel is set for the wireless communication apparatus. When the degraded operation is instructed, control of operation and control within the apparatus are executed so that the settings with respect to the priority channel are performed with a highest priority and power consumption is low. Consequently, a communication system capable of providing a minimum necessary communication service may be configured even if power to be supplied to the wireless communication apparatus is reduced as at a time of a failure in the power supply system of an artificial satellite.

Three methods of executing channel control in the wireless communication apparatus are disclosed in the first, second, and third embodiments. Each of these embodiments, however, does not have to be independently operated. Two or three of the methods may be combined to be carried out.

Fourth Embodiment

In this embodiment, a description will mainly be directed to a difference from the first to third embodiments.

By assigning same reference signs to functions and structures that are the same as those of the wireless communication apparatus 100 described in each of the first to third embodiments, descriptions of the functions and the structures may be omitted.

Figure 19:
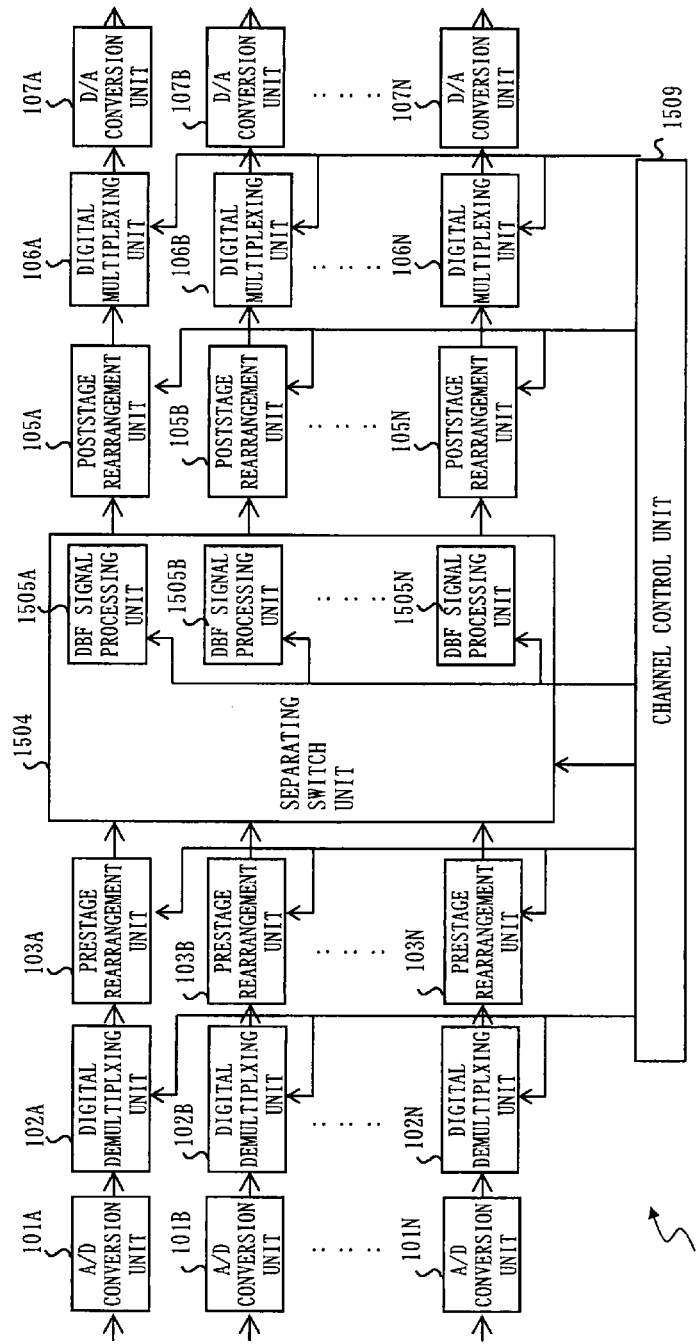
FIG. 19 is a diagram illustrating a configuration of a wireless communication apparatus 1014 according to a fourth embodiment.

FIG. 19 is a diagram illustrating a configuration of a wireless communication apparatus 1014 according to this embodiment.

Even when the wireless communication apparatus 1014 according to this embodiment is configured to function as an apparatus that performs a digital beam forming (DBF) process, an effect similar to those of the first to third embodiments may be obtained.

FIG. 19 is a configuration example when the wireless communication apparatus 100 includes a DBF function.

Herein, configurations and operations of the A/D conversion unit 101, the digital demultiplexing unit 102, the prestage rearrangement unit 103, the poststage rearrangement unit 105, the digital multiplexing unit 106, and the D/A conversion unit 107 are the same as the configurations and the operations disclosed in each of the first to third embodiments.

In this embodiment, a separating switch unit 1504 of the wireless communication apparatus 1014 includes a DBF signal processing unit 1505 for each output port. The DBF signal processing unit 1505 performs channel addition and weight multiplication for beam formation.

A channel control unit 1509 controls alteration of the switching table 704 and provides weight information for the weight multiplication for performing the beam formation, for the DBF signal processing unit 1505.

The DBF signal processing unit 1505 operates in the separating switch unit 1504 by combination of a channel switching function and the DBF function. The DBF process of the DBF signal processing unit 1505 may be divided for each channel.

Accordingly, the channel control unit 108 may execute control of reducing power for each channel, control of extending the service life of a device for each channel, and control of setting the channel of priority. Consequently, an effect similar to those of the first to third embodiments may be obtained even in the wireless communication apparatus 1014 having the separating switch unit 1504 including the DBF signal processing unit 1505 therein.

The above description has been given about the embodiments of the present invention. Two or more of these embodiments may be combined to be carried out. Alternatively, one of these embodiments may be partially carried out. Alternatively, two or more of these embodiments may be partially combined to be carried out. The present invention is not limited to these embodiments, and various modifications of the invention are possible, if necessary.

REFERENCE SIGNS LIST

101: A/D conversion unit, 102: digital demultiplexing unit, 103: prestage rearrangement unit, 104: separating switch unit, 105: poststage rearrangement unit, 106: digital multiplexing unit, 107: D/A conversion unit, 108: channel control unit, 201: artificial satellite, 202: ground station, 203: signal, 204: ground station, 205: transmitted signal, 301, 302, 303: low-pass filter unit, 304: reception channel-filter unit, 305: clock stop instruction unit, 401: selector, 402: information distribution unit, 403: clock stop instruction unit, 501: buffer, 502: read control unit, 503: information distribution unit, 504: clock stop instruction unit, 601, 602, 603, 604, 605, 606, 607, 608: input processing circuit, 611, 612, 613, 614, 615, 616, 617, 618: output processing circuit, 701, 702: selector, 703: device, 704: switching table, 705: clock stop instruction unit, 901: filter unit, 902, 903, 904: transmission low-pass filter unit, 905: clock stop instruction unit, 910: adder, 1001: rearrangement control unit, 102: information control unit, 1010, 1014, 1020: wireless communication apparatus, 1290: nonuse channel information provision function, 1301, 1302, 1303, 1304: device, 1504: separating switch unit, 1505: DBF signal processing unit

The invention claimed is:

1. A wireless communication apparatus including a plurality of input ports and a plurality of output ports, the wireless communication apparatus inputting, for each input port, an analog signal with a plurality of signals multiplexed thereon by a frequency division multiplexing method, the wireless communication apparatus comprising:
an Analog-to-Digital (A/D) converter circuit that is provided for each input port and converts the analog signal that has been input to a digital signal;
a demultiplexer circuit that is provided for each input port, inputs the digital signal obtained by conversion by the A/D converter circuit, and separates the digital signal that has been input into the plurality of signals;
a prestage rearrangement circuit that is provided for each input port, inputs the plurality of signals from the demultiplexer circuit, and rearranges channels of the plurality of signals that have been input to be output as a plurality of prestage rearranged signals;
a switch circuit including a per-channel processing circuit having a configuration in which a block that performs a switching process may be separated for each at least one channel, the per-channel processing circuit inputting at least one of the plurality of prestage rearranged signals output from the prestage rearrangement circuit corresponding to a channel of the per-channel processing circuit as a signal before switching, applying the switching process to the signal before the switching that has been input, and outputting the signal before the switching with the switching process applied thereto as a switched signal, the switch circuit outputting switched signals output from the per-channel processing circuits as a plurality of switched signals for each output port;
a poststage rearrangement circuit that is provided for each output port, inputs the plurality of switched signals output from the switch circuit for each output port, and rearranges channels of the plurality of switched signals that have been input to be output as a plurality of poststage rearranged signals;
a multiplexer circuit that is provided for each output port, inputs the plurality of poststage rearranged signals output from the poststage rearrangement circuit, and multiplexes the plurality of poststage rearranged signals that have been input, by the frequency division multiplexing method; and
a Digital-to-Analog (D/A) converter circuit that is provided for each output port and converts the digital signal obtained by multiplexing by the multiplexer circuit to an analog signal.

2. The wireless communication apparatus according to claim 1,
wherein the prestage rearrangement circuit outputs each of the plurality of prestage rearranged signals from at least one of a plurality of prestage output channels with channel numbers respectively assigned thereto;
wherein the switch circuit includes a plurality of switch circuit input channels provided for each input port and with channel numbers assigned thereto and a plurality of switch circuit output channels provided for each output port and with channel numbers assigned thereto, and the switch circuit inputs the plurality of prestage rearranged signals output for each input port, through the plurality of switch circuit input channels with the channel numbers thereof corresponding to the plurality of prestage rearranged signals, as the signals before the switching;

wherein the per-channel processing circuit executes the switching process for at least one of the signals before the switching input for each input port and input into the switch circuit input channel with the channel number thereof corresponding to the channel of the per-channel processing circuit, and outputs, to the switch circuit output channel with the channel number thereof corresponding to the channel after the switching process, the at least one of the signals before the switching subjected to the switching process, as the switched signal; and wherein the poststage rearrangement circuit inputs the plurality of the switched signals output from the plurality of switch circuit output channels provided for each output port, and outputs the plurality of poststage rearranged signals.

3. The wireless communication apparatus according to claim 2, wherein the per-channel processing circuit has a configuration in which a block may be separated for each at least one channel number.

4. The wireless communication apparatus according to claim 3, wherein the wireless communication apparatus comprises:

a control circuit that transmits to the prestage rearrangement circuit prestage rearrangement information based on which the plurality of signals that have been input are rearranged; and wherein the control circuit transmits to the prestage rearrangement circuit the prestage rearrangement information including the channel numbers of the prestage output channels from which the plurality of prestage rearranged signals are output.

5. The wireless communication apparatus according to claim 4, wherein the control circuit transmits the prestage rearrangement information on the prestage output channels from which the plurality of rearranged signals are output such that the number of operation blocks of the per-channel processing circuits separated into the blocks is minimized; and wherein the control circuit transmits poststage rearrangement information to the poststage rearrangement circuit such that the plurality of switched signals output from the switch circuit for each output port are respectively a plurality of channel signals to be output as the plurality of signals separated by the demultiplexer circuit.

6. The wireless communication apparatus according to claim 5, wherein the switch circuit includes:

a switching table that stores the channel numbers of the respective plurality of switch circuit input channels for each input port into which the signals before the switching are input, in association with the channel numbers of the respective plurality of switch circuit output channels for each output port from which the switched signals after the switching of the signals before the switching are output;

wherein the switching table is set based on setting information generated by the control circuit; and wherein the control circuit generates the setting information for updating the switching table such that prestage input channels for which the rearrangement has been performed by the prestage rearrangement circuit and poststage output channels for which the rearrangement has been performed by the poststage rearrangement circuit maintain prestage input channels and poststage output channels before the rearrangements by the prestage rearrangement circuit and the poststage rearrangement circuit, and transmits the setting information to the switch circuit.

7. The wireless communication apparatus according to claim 6, wherein the demultiplexer circuit includes a plurality of demultiplexer channels with channel numbers assigned thereto;

wherein the multiplexer circuit includes a plurality of multiplexer channels with channel numbers assigned thereto;

wherein the control circuit inputs switching information that associates the channel numbers of the plurality of demultiplexer channels of the demultiplexer circuit for each input port and the channel numbers of the plurality of multiplexer channels of the multiplexer circuit for each output port, the plurality of signals being respectively output from the plurality of demultiplexer channels of the demultiplexer circuit; and wherein the control circuit generates the poststage rearrangement information such that channel numbers of the poststage output channels from which the plurality of poststage rearranged signals are output are the channel numbers of the multiplexer channels of the multiplexer circuit for each output port included in the switching information, and transmits the poststage rearrangement information to the poststage rearrangement circuit.

8. The wireless communication apparatus according to claim 7, wherein the demultiplexer circuit is constituted from a filter bank having a configuration in which a block that performs a demultiplexing process for each of the plurality of demultiplexer channels may be separated; and wherein the multiplexer circuit is constituted from a filter bank having a configuration in which a block that performs a multiplexing process for each of the plurality of multiplexer channels may be separated.

9. The wireless communication apparatus according to claim 7, wherein the control circuit regularly or irregularly changes one of the channel numbers of the prestage output channels from which the plurality of prestage rearranged signals are output, and alters the setting information and the poststage rearrangement information according to execution of the change.

10. The wireless communication apparatus according to claim 7, wherein the control circuit inputs priority information with priorities set for channel numbers for each input port, and specifies, as a priority channel number, the channel number of the demultiplexer channel for the input port to which the signal is preferentially to be transmitted, based on the priority information that has been input, and changes a switching destination of the signal of priority input to the switch circuit from the switch circuit input channel corresponding to the priority channel number to the switch circuit output channel corresponding to the priority channel number.

11. The wireless communication apparatus according to claim 10, wherein the control circuit generates the prestage rearrangement information such that the prestage rearrangement circuit does not use the channel corresponding to the channel number other than the priority channel number.

12. The wireless communication apparatus according to claim 1, wherein the switch circuit is constituted from a switching processing block having a configuration in which a block that performs the switching process for each channel may be separated and a Digital Beam Forming (DBF) signal processing block that performs processes of channel addition and weight multiplication according to a beam to be formed.

13. A wireless communication control method of a wireless communication apparatus including a plurality of input ports and a plurality of output ports, the wireless communication apparatus inputting, for each input port, an analog signal with a plurality of signals multiplexed thereon by a frequency division multiplexing method, the wireless communication control method comprising:

for each input port, converting the analog signal that has been input to a digital signal;

for each input port, inputting the digital signal obtained by conversion, and separating the digital signal that has been input into the plurality of signals;

for each input port, inputting the plurality of signals and rearranging channels of the plurality of signals that have been input to be output as a plurality of prestage rearranged signals;

for each input port, by a per-channel processing circuit having a configuration in which a block that performs a switching process may be separated for each at least one channel, inputting at least one of the plurality of prestage rearranged signals that have been output corresponding to a channel of the per-channel processing circuit as a signal before switching, applying the switching process to the signal before the switching that has been input, and outputting the signal before the switching with the switching process applied thereto as a switched signal, thereby outputting a plurality of switched signals for each output port;

for each output port, inputting the plurality of switched signals that have been output for each output port, and rearranging channels of the plurality of switched signals that have been input to be output as a plurality of poststage rearranged signals;

for each output port, inputting the plurality of poststage rearranged signals that have been output, and multiplexing the plurality of poststage rearranged signals that have been input, by the frequency division multiplexing method; and for each output port, converting the digital signal obtained by multiplexing to an analog signal.

* * * * *